(12) United States Patent
Komine et al.

(10) Patent No.: US 6,728,727 B2
(45) Date of Patent: Apr. 27, 2004

(54) DATA MANAGEMENT APPARATUS STORING UNCOMPLEX DATA AND DATA ELEMENTS OF COMPLEX DATA IN DIFFERENT TABLES IN DATA STORING SYSTEM

(75) Inventors: Hiroaki Komine, Kawasaki (JP); Noriyuki Yokoshi, Kawasaki (JP); Hiroko Yokota, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/540,891

(22) Filed: Mar. 31, 2000

(65) Prior Publication Data

US 2003/0208509 A1 Nov. 6, 2003

(30) Foreign Application Priority Data

Jul. 19, 1999 (JP) .......................................... 11-204010

(51) Int. Cl.[7] .............................. G06F 7/00; G06F 17/00
(52) U.S. Cl. .................... 707/103 R; 707/101; 707/102
(58) Field of Search ................................ 707/200, 102, 707/101, 100, 3, 103, 103 R; 395/600, 500

(56) References Cited

U.S. PATENT DOCUMENTS

| | | | | |
|---|---|---|---|---|
| 5,295,256 A | * | 3/1994 | Bapat ............................ 707/3 |
| 5,437,027 A | * | 7/1995 | Bannon et al. ........... 707/103 R |
| 5,542,078 A | * | 7/1996 | Martel et al. ................ 707/101 |
| 5,799,309 A | * | 8/1998 | Srinivasan ................... 707/100 |
| 5,799,310 A | * | 8/1998 | Anderson et al. ........... 707/102 |
| 5,857,197 A | * | 1/1999 | Mullins ....................... 707/102 |
| 6,047,291 A | * | 4/2000 | Anderson et al. ....... 707/103 R |
| 6,192,370 B1 | * | 2/2001 | Primsch .................. 707/103 R |
| 6,374,252 B1 | * | 4/2002 | Althoff et al. .............. 707/100 |

FOREIGN PATENT DOCUMENTS

| | | |
|---|---|---|
| JP | 07295816 | 5/1997 |
| JP | 10003422 | 1/1998 |
| JP | 10161923 | 6/1998 |

OTHER PUBLICATIONS

A. Farris (1994), Modeling Complex Astrophysics Data, pp. 149–158.*
Veronique Stephan (1996), Extracting Symbolic Objects from Relational Databases, pp. 514–519.*
Michael Stonebraker, Jeff Anton, and Eric Hanson, (1987), Extending a Database System with Procedures, pp. 350–376.*

* cited by examiner

Primary Examiner—Safet Metjahic
Assistant Examiner—Merilyn P Nguyen
(74) Attorney, Agent, or Firm—Katten Muchin Zavis Rosenman

(57) ABSTRACT

A data storage and management apparatus for storing and managing data of an object as a persistent object in a data storing system. When storing an object in the data storing system, information on complexity of data of at least one attribute of the object is recorded in the apparatus, and data of each of the at least one attribute of the object is stored in a first table in the data storing system when the data of the attribute is not complex data, and in a second table in the data storing system when the data of the attribute is complex data. When manipulating data of an attribute of the object in the data storing system, the above information on complexity is referred to, and manipulation is performed on the first table when the data of the attribute is not complex data, and on the second table when the data of the attribute is complex data.

27 Claims, 19 Drawing Sheets

MAIN TABLE FOR EACH RESOURCE MANAGER

| DN | B | ···OTHER ATTRIBUTES··· |
|----|---|------------------------|
| MO1 | 1 | ..... |
| MO2 | 5 | ..... |

28

SUBTABLE FOR THE TYPE OF SS (:SEQUENCE<S>)

| id | int a | float b | char c | sid |
|----|-------|---------|--------|-----|
| 1  | 10    | 11.1    | a      | 1   |
| 2  | 20    | 22.2    | b      | 1   |
| 3  | 30    | 33.3    | c      | 1   |
| 4  | 40    | 44.4    | d      | 1   |
| 5  | 50    | 55.5    | e      | 5   |
| 6  | 60    | 66.6    | f      | 5   |

MAIN TABLE FOR EACH RESOURCE MANAGER 28

| DN | B' | ···OTHER ATTRIBUTES··· |
|---|---|---|
| MO1 | 1 | ..... |
| MO2 | 2 | ..... |
| ⋮ | ⋮ | ⋮ |
| MOn | n | ..... |

SUBTABLE FOR THE TYPE OF STRUCT S 29-3

| id | int a | float b | char c | sid |
|---|---|---|---|---|
| 1 | 10 | 11.1 | a | 0 |
| 2 | 20 | 22.2 | b | 0 |
| ⋮ | ⋮ | ⋮ | ⋮ | ⋮ |
| n | x | yy.y | z | 0 |

FIG. 11

DATA MANAGEMENT APPARATUS STORING UNCOMPLEX DATA AND DATA ELEMENTS OF COMPLEX DATA IN DIFFERENT TABLES IN DATA STORING SYSTEM

BACKGROUND OF THE INVENTION

1) Field of the Invention

The present invention relates to a data management apparatus for managing at least one managed object (MO) stored as at least one persistent object in a data storing system. The present invention also relates to a data storage and management process for storing and managing an object as a persistent object in the data storing system. In particular, the present invention is suitable for use in management of objects (MOs) in an information management system which is realized by using the object-oriented technology.

2) Description of the Related Art

Recent information management systems using the object-oriented technology handle great amounts of data having different structures which are respectively defined by individual users. Therefore, such information management systems are required to flexibly handle and efficiently process the differently structured data so as to manage data contained in a plurality of managed objects in consideration of complexity of required operations.

FIG. 18 is a diagram illustrating an outline of an information management system. The information management system 1 illustrated in FIG. 1 is provided for managing a communication system. In the example of FIG. 18, the managed communication system contains a group 7 of network elements 7-1, 7-2, . . . 7-n, and is connected to the information management system 1 through a data communication network 6. In order to issue manipulation requests to the information management system 1, an upper level system group 3 is connected to the information management system 1 through another data communication network 2. In the upper level system group 3, each of a plurality of computers 3-1, 3-2, . . . 3-n' functions as a client. In addition, a group 5 of graphical user interface (GUI) terminals 5-1, 5-2, . . . 5-n" is connected to the information management system 1 through a local area network (LAN) 4. Each of the graphical user interface (GUI) terminals 5-1, 5-2, . . . 5-n" is a computer, which also functions as a client, communicates with the information management system 1 in accordance with the TCP/IP protocol, and issues manipulation requests to the information management system 1.

The information management system 1 comprises a computer 1-1 and a database (DB) 1-2. A system program for realizing the information management system 1 is installed in the computer 1-1. The system program realizes two objects, a resource manager (RM) 1-3 and a persistent object service (POS) 1-4. The resource manager 1-3 is provided for managing data stored in the database 1-2, and the persistent object service 1-4 is provided for performing manipulations data in the database 1-2. The resource manager 1-3 manages data relating to the network elements 7-1, 7-2, . . . 7-n and information used for responding to requests by the upper level system group 3 and the graphical user interface (GUI) terminals 5-1, 5-2, . . . 5-n", where the data relating to the network elements are necessary for managing and controlling the respective network elements 7-1, 7-2, . . . 7-n. The above data and information for management and control of the network elements 7-1, 7-2, . . . 7-n are stored by the persistent object service 1-4 in the database 1-2 as managed objects, and are maintained in the database 1-2 as persistent objects. The data and information for management and control of the network elements 7-1, 7-2, . . . 7-n (hereinafter called management information) include information relating to connection and establishment of circuits, monitoring of transmission lines and transmission devices for failures, control of switching of transmission lines in the case of failure, and the like.

FIG. 19 is a diagram illustrating details of a conventional construction of the information management system, which manages objects (called managed objects) in the database 1-2 as persistent objects. In addition to the above-mentioned functions, the resource manager 1-3 functions as an interface with the aforementioned clients (i.e., client applications). As mentioned above, the computers 3-1, 3-2, . . . 3-n' in the upper level system group 3 and the graphical user interface (GUI) terminals 5-1, 5-2, . . . 5-n" in the group 5 are the clients. The persistent object service 1-4 contains a persistent query manager (PQM) 1-5, which functions as an interface with the resource manager 1-3.

In the construction of FIG. 19, each of the managed objects (MO) may contain as attribute complex data which is comprised of a plurality of data elements, such as a structure containing a plurality of members (defined in the programming languages C and C++). For example, a structure is declared as follows.

```
struct S
{
    int    a;
    float  b;
    char   c;
}
struct S d;   //d: Name of Attribute
```

In the conventional data management apparatus, the database 1-2 stores the respective members in the structure in a main table T1 as illustrated in FIG. 19. That is, the main table T1 contains a distinguish name (DN) and attributes for each managed object, and data of all of the attributes are included in the main table T1. In addition, the resource manager 1-3 contains an attribute management table T2, which contains as table elements an attribute name, a data type or data structure, and the number of members of each structure.

When a client issues a request for manipulation of a managed object stored in the database 1-2, the resource manager 1-3 receives the request, and determines one of the attributes of the managed object of which the manipulation is requested to be performed. Since complex data (e.g., a structure) per se cannot be treated as an attribute in the database 1-2, the complex data must be decomposed into data elements (e.g., members of the structure) each being a basic data type (i.e., integer, floating point number, character, or the like) before performing manipulation of data in the database 1-2, and the resource manager 1-3 is required to recognize data types of respective data elements of the complex data (members of the structure). Therefore, the resource manager 1-3 determines whether or not the attribute of which the manipulation is requested to be performed contains complex data. When the resource manager 1-3 determines that the attribute of which the manipulation is requested to be performed contains complex data, the resource manager 1-3 refers to the attribute management table T2, decomposes the complex data into data elements each being a basic data type, and requests the persistent query manager 1-5 to perform the requested manipulation of the data elements (e.g., members of the structure) each being a basic data type. The persistent object service 1-4 queues manipulation requests received from the resource manager 1-3, and passes the manipulation requests to the persistent query manager 1-5 one by one. The persistent query manager 1-5 translates the passed manipulation request (including its manipulation condition) into a query language, and performs the requested manipulation of the database 1-2. When the persistent query manager 1-5 receives a response in the query language from the database 1-2, the persistent query manager 1-5 translates the response into a form which can be recognized by the resource manager 1-3. When the resource manager 1-3 receives the response, the resource manager 1-3 composes data elements (members) each being a basic data type in the response, into the form of complex data, and sends the complex data to the client.

In addition, in the case wherein the persistent query manager 1-5 receives manipulation requests from more than one resource manager, the persistent query manager 1-5 also translates the manipulation requests and performs the requested manipulation of the database 1-2, one by one.

As described above, when a managed object contains complex data as an attribute, the database 1-2 can handle the complex data only as a plurality of decomposed data elements each being a basic data type. Therefore, when a managed object contains complex data as an attribute, the substantial number of attributes for each managed object included in the main table T1 in the database 1-2 becomes great. In addition, in order to decompose every complex data into data elements, the resource manager 1-3 is required to recognize all of the complex data (e.g., structures).

Therefore, the incapability of handling complex data in the database increases processing load imposed on the resource manager, and further affects the condition for receiving the manipulation requests from clients. In addition, the resource manager has to wait for completion of the operation of the previous request in the persistent query manager before passing a new request for manipulation to the persistent query manager. Therefore, processing is delayed.

SUMMARY OF THE INVENTION

The object of the present invention is to provide a data management apparatus which enables efficient storage and management of an object as a persistent object in a database even when the object contains complex data as an attribute.

(1) According to the first aspect of the present invention, there is provided a data management apparatus for managing at least one managed object stored as at least one persistent object in a data storing system. The data management apparatus contains a complexity information holding unit which holds information on complexity of data of each of at least one attribute of the at least one managed object; a first request receiving unit which receives a request for manipulation of data of one of the at least one attribute of the at least one managed object; a complex data determining unit which refers to the complexity information holding unit to determine whether or not the data of the said one of the at least one attribute is complex data; and a manipulation performing unit which performs the manipulation requested by the request on a first table when the data of the said one of the at least one attribute of which the manipulation is requested by the request is not complex data, and performs the manipulation requested by the request on a second table when the data of the said one of the at least one attribute of which the manipulation is requested by the request is complex data, where the first table contains uncomplex data included in the at least one managed object, the second table contains complex data included in the at least one managed object, and the first and second tables are stored in the data storing system.

The data management apparatus according to the first aspect of the present invention may have the following additional features.

(i) The second table may be provided for each type of structure of the complex data.

(ii) The manipulation performing unit may translate the request into a query language which can be recognized by a database system when the data storing system is realized by the database system.

(iii) An identifier may be assigned to each of the at least one attribute of the at least one managed object when the each of the at least one attribute contains complex data, and the first and second tables may be related with each other by using the identifier.

(iv) The manipulation performing unit may contain a first manipulation unit which performs the manipulation requested by the request on the first table, and a second manipulation unit which performs the manipulation requested by the request on the second table.

(v) The data management apparatus according to the first aspect of the present invention may further contain at least one manipulation object each of which is provided for a specific type of data structure of complex data, and assists the manipulation performing unit in the manipulation when the said one of the at least one attribute contains complex data having the specific type of data structure; and a manipulation object table which indicates one of the at least one manipulation object for use in manipulation of complex data of an attribute having each data structure.

(vi) The data management apparatus according to the first aspect of the present invention may further contain a generation unit which creates a thread, and generates a manipulation unit as a portion of the manipulation performing unit when one of the first and at least one second request receiving units receives a request for manipulation on an attribute of one of the at least one managed object, where the manipulation unit performs the manipulation of the attribute of one of the at least one managed object.

(vii) The data management apparatus according to the first aspect of the present invention may further contain a generation unit which generates the manipulation performing unit when the first request receiving unit receives the request.

(viii) In addition to the above additional feature (vii), the manipulation performing unit may contain at least one manipulation object each of which is provided for a specific type of data structure of complex data, and performs the manipulation when the said one of the at least one attribute contains complex data having the specific type of data structure; and a manipulation object table which indicates one of the at least one manipulation object for use in manipulation of complex data of an attribute having each data structure.

(ix) The data management apparatus according to the first aspect of the present invention may further contain at least one second request receiving unit each of which receives a request for manipulation of one of the at least one attribute of the at least one managed object, and the first and at least one second request receiving units receive the requests from a plurality of clients.

(x) The first table may be provided corresponding to each of the first and at least one second request receiving units.

(xi) A data management apparatus according to the first aspect of the present invention may further contain a condition translation unit which translates information on a condition on the manipulation into a query language which can be recognized by a database system when the data storing system is realized by the database system, and the condition is included in the request received by the first request receiving unit.

(xii) A data management apparatus according to the first aspect of the present invention may further contain a generation unit which generates a condition translation unit when the request includes information on a condition on the manipulation requested to be performed on the said one of the at least one managed object, where the condition translation unit translates the information on the condition into a query language which can be recognized by a database system when the data storing system is realized by the database system.

(xiii) A data management apparatus according to the first aspect of the present invention may further contain a filter processing unit which performs a filtering operation on the data stored in the data storing system, based on a condition on the manipulation, when the data storing system is not realized by the database system, and the condition is included in the request received by the first request receiving unit.

(2) According to the second aspect of the present invention, there is provided a data storage and management process for storing and managing data of at least one attribute of an object as a persistent object in a data storing system. The process includes the steps of (a) receiving a request for storing the data of the at least one attribute of the object; (b) recording information on complexity of data of each of the at least one attribute of the object; and (c) storing the data of said each of the at least one attribute of the object in a first table in the data storing system when the data of said each of the at least one attribute of the object is not complex data, and storing the data of said each of the at least one attribute of the object in a second table in the data storing system when the data of said each of the at least one attribute of the object is complex data.

Therefore, the complexity information holding unit and the first and second tables in the data management apparatus according to the first aspect of the present invention can be produced by executing the process according to the second aspect of the present invention.

(3) According to the third aspect of the present invention, there is provided a data storage and management process for storing and managing complex data of an attribute of an object as a persistent object in a data storing system, where the complex data is comprised of a plurality of data elements having an identical data type. The process includes the steps of (a) storing an identifier of the complex data instead of the attribute of the object in a first table; and (b) storing the plurality of data elements with the identifier of the complex data in a second table.

In the data management apparatus according to the third aspect of the present invention, the plurality of data elements may be stored in the second table successively with consecutive numbers.

(4) According to the fourth aspect of the present invention, there is provided a data storage and management process for storing and managing a data set each being comprised of at least one complex data item having identical data structure, as an attribute of a persistent object, in a data storing system, where each of the at least one complex data item is comprised of a plurality of data elements each having a data type. The process includes the steps of (a) storing an identifier of the data set instead of the attribute of the persistent object in a first table; and (b) storing the plurality of data elements of the at least one complex data item of the data set with the identifier of the data set in a second table which is provided for each data structure.

The data storage and management process according to the fourth aspect of the present invention may have the following additional features.

(i) The at least one complex data item may be stored in the second table successively, together with at least one consecutive number assigned to the at least one complex data item.

(ii) The at least one complex data item may be stored in the second table with a value indicating that the at least one complex data item includes only one complex data item, when the number of the at least one complex data item is one.

(5) According to the fifth aspect of the present invention, there is provided a data management apparatus for managing data of an object stored as a persistent object in a data storing system which has no available filtering function. The data management apparatus contains a resource management unit which functions as an interface with a client application, and receives a request for manipulation of the object, from the client application, where the request includes information on a filtering condition which is to be satisfied in the manipulation; and a manipulating unit which performs the manipulation of the object, where the manipulation includes a filtering operation in accordance with the filtering condition.

(6) According to the sixth aspect of the present invention, there is provided a product for use with a data management apparatus for managing at least one managed object stored as at least one persistent object in a data storing system, where the product, when used with the data management apparatus, is able to output control information which directs the data management apparatus so as to realize the data management apparatus according to the first aspect of the present invention.

(7) According to the seventh aspect of the present invention, there is provided a product for use with a data management apparatus for managing at least one managed object stored as at least one persistent object in a data storing system, where the product, when used with the data management apparatus, is able to output control information which directs the data management apparatus to execute the process according to the second aspect of the present invention.

(8) According to the eighth aspect of the present invention, there is provided a product for use with a data storage and management apparatus for storing and managing complex data of an attribute of an object as a persistent object in a data storing system, where the complex data is comprised of a plurality of data elements having an identical data type, where the product, when used with the data storage and management apparatus, is able to output control information which directs the data storage and management apparatus to execute the process according to the third aspect of the present invention.

(9) According to the eighth aspect of the present invention, there is provided a product for use with a data storage and management apparatus for storing and managing a data set each being comprised of at least one complex data item having identical data structure, as an attribute of a persistent object, in a data storing system, where each of the at least one complex data item is comprised of a plurality of data elements each having a data type, where the product, when used with the data storage and management apparatus, is able to output control information which directs the data storage and management apparatus to execute the process according to the fourth aspect of the present invention.

(10) According to the eighth aspect of the present invention, there is provided a product for use with a data management apparatus for managing data of an object stored as a persistent object in a data storing system which has no available filtering function, where the product, when used with the data management apparatus, is able to output control information which directs the data management apparatus to realize the data management apparatus according to the fifth aspect of the present invention.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 10 is a diagram illustrating examples of contents of the main table and the subtable when managed objects contain complex data comprised of a series of structures having an identical data structure;

FIG. 11 is a diagram illustrating examples of contents of the same main table and the same subtable as those of FIG. 10 when managed objects contain as a plurality of attributes a plurality of structures having an identical data structure;

DESCRIPTION OF THE PREFERRED EMBODIMENTS

Embodiments of the present invention are explained in detail below with reference to drawings.

(1) Functions of Data Management Apparatuses

Figure 1:
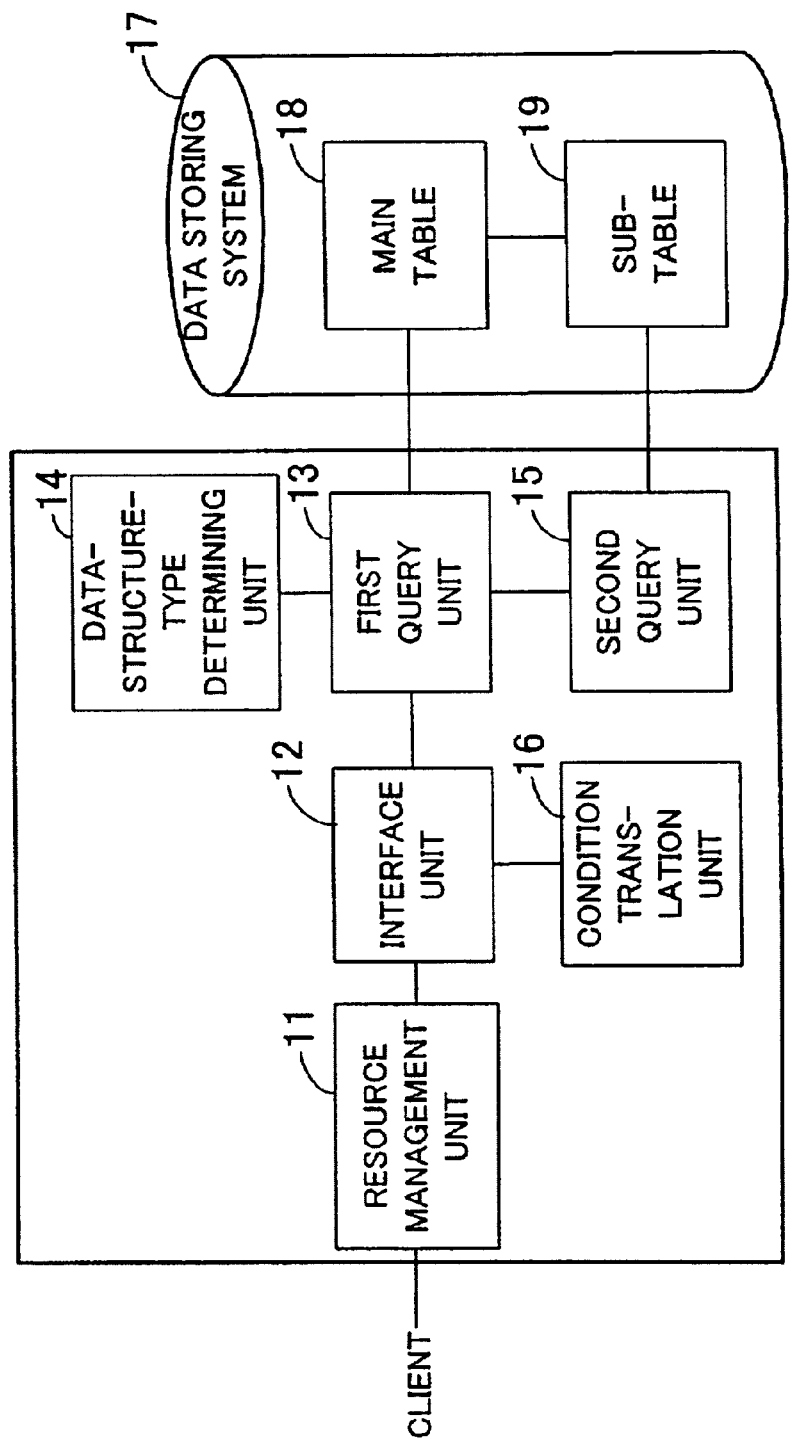
FIG. 1 is a diagram illustrating blocks of functions which the data management apparatuses in the first to ninth embodiments of the present invention may comprise.

FIG. 1 is a diagram illustrating blocks of functions which the data management apparatuses in the first to ninth embodiments of the present invention may comprise. The functions of the data management apparatuses are provided for receiving a request for manipulation of a managed object stored as a persistent object in a data storing system 17, and performing the manipulation. In FIG. 1, reference numeral 11 denotes a resource management unit, 12 denotes an interface unit, 13 denotes a first query unit, 14 denotes a data-structure-type determining unit, 15 denotes a second query unit, 16 denotes a condition translation unit, 17 denotes the data storing system, 18 denotes a main table, and 19 denotes a subtable.

As illustrated in FIG. 1, the data storing system 17 stores the main table 18 and the subtable 19, where the main table 18 stores attributes of uncomplex data and an identifier of each complex data item as an attribute, and the subtable 19 stores data of each data element of each complex data item together with the above identifier.

The resource management unit 11 receives from a client a request for manipulation of data of an attribute of a managed object stored as a persistent object in the data storing system 17, and sends to the client a response to the manipulation, which is obtained from the data storing system 17. The interface unit 12 functions as an interface between the resource management unit 11 and a portion of the data management apparatus which performs manipulation of the managed object stored in the data storing system 17.

The first query unit 13 performs the requested manipulation of the main table 18 in the data storing system 17. In the case wherein the data storing system 17 is a database system, the first query unit 13 performs the requested manipulation by translating the above request received by the resource management unit 11, into a query language, and inputs the translated request to the database system. In addition, the first query unit 13 receives the response to the manipulation, which is obtained from the data storing system 17, and translates the response into the same form as the above request before translated, when the data storing system 17 is a database system.

The data-structure-type determining unit 14 determines whether or not the data structure of the attribute of the managed object, of which the manipulation is requested, is a type of complex data (e.g., a structure). The second query unit 15 is dedicated to manipulation of the subtable 19 in the data storing system 17. That is, when the data-structure-type determining unit 14 determines that the data structure of the attribute of the managed object is a type of complex data (e.g., a structure), the second query unit 15 performs manipulation of data in the subtable 19 which is associated with an identifier of the attribute of the managed object in the main table 18. In addition, the second query unit 15 receives the response to the manipulation, which is obtained from the data storing system 17, and translates the response into the same form as the above request before translated, when the data storing system 17 is a database system.

The condition translation unit 16 is provided in the fifth, sixth, seventh, and eighth embodiments. When the above request includes a manipulation condition, the condition translation unit 16 translates the manipulation condition into the query language.

When the data management apparatus having the above construction receives a manipulation request to which a distinguish name of a managed object and a name of an attribute are attached, the resource management unit 11 obtains information on a type of data structure corresponding to the name of the attribute from a list which the resource management unit 11 has, attaches the information to the manipulation request, and passes the manipulation request to the interface unit 12. The interface unit 12 transfers the manipulation request to the first query unit 13. The first query unit 13 performs the requested manipulation of the data in the data storing system 17, receives from the data storing system 17 a response to the manipulation, and passes the response to the interface unit 12. In the case wherein the data storing system 17 is a database system, the first query unit 13 translates the manipulation request into the query language, and accesses the database system 17. That is, the first query unit 13 performs the requested manipulation of the data in the data storing system 17 by inputting the translated request to the database system 17. In addition, the first query unit 13 receives from the database system 17 a response to the manipulation, and translates the response into the same form as the above request. The translated response is returned to the client through the interface unit 12 and the resource management unit 11.

In addition, when the first query unit 13 receives the above manipulation request during the above operations, the data-structure-type determining unit 14 determines whether or not the data structure of the attribute of the managed object, of which the manipulation is requested, is a type of complex data (e.g., a structure). When the data-structure-type determining unit 14 determines that the data structure of the attribute of the managed object is a type of complex data (e.g., a structure), the second query unit 15 performs the manipulation of data in the subtable 19 which is associated with an identifier of the attribute of the managed object in the main table 18. The response to the manipulation is returned to the client through the first query unit 13, the interface unit 12, and the resource management unit 11.

When the manipulation request includes a manipulation condition, the interface unit 12 uses the condition translation unit 16 to translate the manipulation condition into the query language, and the translated manipulation condition, together with the manipulation request, is passed to the first query unit 13. When the first query unit 13 receives the manipulation request and the manipulation condition, the first query unit 13 performs the requested manipulation of data in the data storing system 17 in accordance with the manipulation condition.

As described above, the data management apparatus having the above functions can manage an object, containing complex data as an attribute, as a persistent object in a database.

(2) First Embodiment

Figure 2:
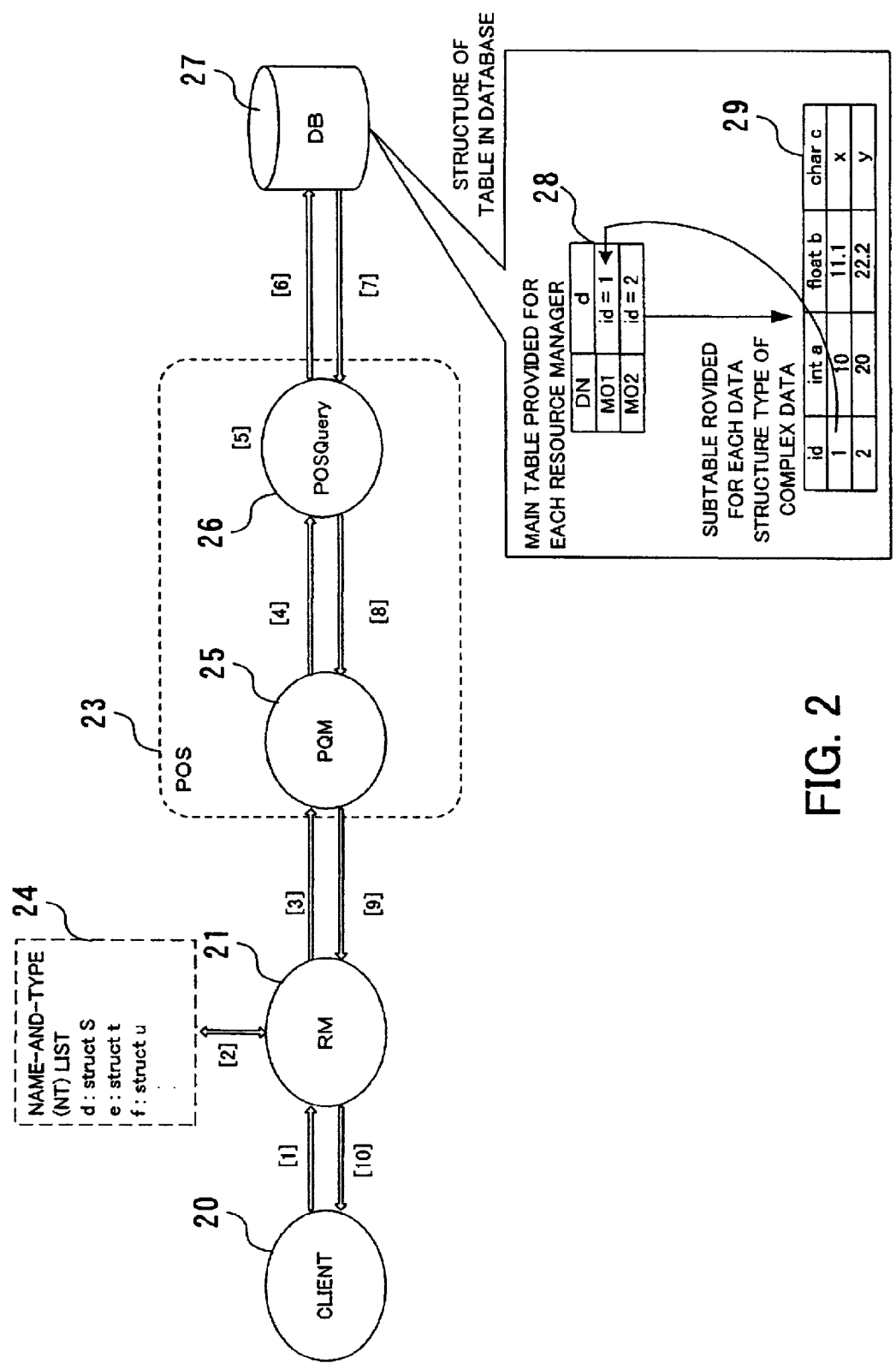
FIG. 2 is a diagram illustrating the construction of the data management apparatus as the first embodiment of the present invention.

FIG. 2 is a diagram illustrating the construction of the data management apparatus as the first embodiment of the present invention. The data management apparatus of FIG. 2, comprises at least one resource manager 21, a persistent object service (POS) 23, and a database system 27. Each resource manager (RM) 21 receives manipulation requests from clients 20, and returns to the clients 20 responses to manipulations of the database 27. That is, each resource manager 21 functions as an interface between the clients 20 and the persistent object service (POS) 23. In addition, each resource manager 21 hold a name-and-type (NT) list 24, which indicates correspondences between names of attributes of managed objects and types of data structure of data of the attributes. The persistent object service 23 provides services for managing persistent objects, and comprises a persistent query manager (PQM) 25 and a POS query object 26. The persistent query manager 25 includes a function of an interface with the resource manager 21. That is, the persistent query manager 25 provides an interface function which enables each resource manager 21 to perform requested manipulations of managed objects which are stored as persistent objects in the database system 27. The POS query object 26 actually performs manipulations of the database system 27.

The above resource manager 21 and the persistent query manager 25 in FIG. 2 respectively realize the functions of the resource management unit 11 and the interface unit 12 in FIG. 1. The POS query object 26 in FIG. 2 realizes the function of the first query unit 13 and the data-structure-type determining unit 14 in FIG. 1.

The database system 27 stores a main table 28 provided for each resource manager 21, and a subtable 29 provided for each type of data structure of complex data of an attribute. Each main table 28 contains an identifier (id) of each attribute of complex data (e.g., a structure) in each managed object, and the subtable 29 provided for the type of the data structure of the attribute contains actual values of data elements (e.g., members) of the complex data (e.g., the structure) corresponding to the identifier. In the example illustrated in FIG. 1, a managed object contains an attribute having a name d and structure "struct S" which includes three members a, b, and c, respectively having basic data types "int", "float", and "char". The NT list 24 in the resource manager 21 holds information on correspondence between the name d of the attribute and the data structure type "struct S".

The operations of the construction of FIG. 2 are explained below. The operations are performed in the order of reference numbers [1] to [10] in FIG. 2.

When the resource manager 21 receives from a client 20 a manipulation request for manipulation of data of an attribute of a managed object [1], the resource manager 21 refers to the NT list 24 for obtaining the type of data structure of the attribute of which manipulation is requested by the manipulation request [2]. Then, the resource manager 21 attaches, to the manipulation request, information on the obtained type of data structure, and sends the manipulation request to the persistent query manager 25 in the persistent object service 23 [3]. Next, the persistent query manager 25 passes the manipulation request to the POS query object 26, and requests the POS query object 26 to perform the manipulation [4]. The POS query object 26 translates the contents of the manipulation request into the query language [5], and performs the manipulation of the main table 28 in the database system 27 [6]. An identification name, which is called a distinguish name (DN), is assigned to each managed object, and used in the main table 28 as a primary key to each managed object. In addition, manipulation of complex data as an attribute of a managed object is performed in each subtable 29 based on the above information on the obtained type of data structure. Consecutive identifiers (id) are assigned as primary keys to rows of each subtable 29, and the main table 28 contains one of the consecutive identifiers (id) which are assigned to rows of each subtable 29 containing data elements of each attribute having complex data, instead of the complex data per se. Thus, the main table 28 and each of corresponding subtables 29 are related with each other.

When a response to the manipulation is output from the database system 27 to the POS query object 26 [7], the POS query object 26 translates the response into the same form as the above manipulation request. Then, the translated response is returned to the client 20 through the persistent query manager 25 and the resource manager 21 ([8], [9], and [10]).

Figure 19:
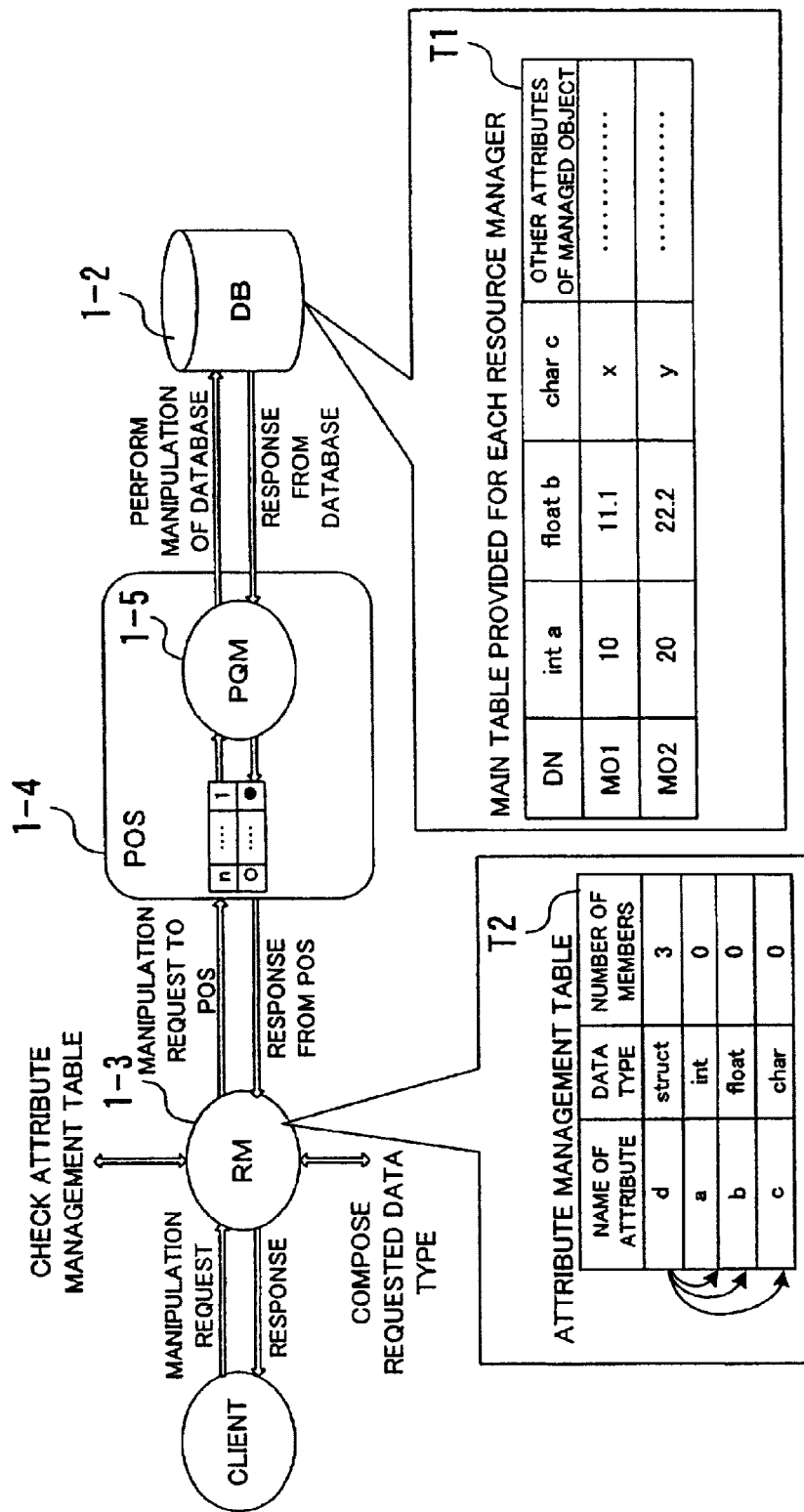
FIG. 19 is a diagram illustrating the construction of the conventional data management apparatus.

As described above, in the first embodiment of the present invention, the POS query object 26 has the functions of translation of manipulation requests into the query language and access to the database system. In addition, the NT list 24 in the resource manager 21 includes only names and corresponding types of data structures of attributes of complex data, and does not include information on the members of the structures, while the table T2 in the conventional construction of FIG. 19 includes information on the members of the structures. Instead, the information on the members of the structures is included in the subtable 29 in the present invention. Therefore, the resource manager 21 can handle attributes of complex data in the same manner as attributes of uncomplex data, and does not need to decompose or compose complex data. Further, since the subtable 29 is provided for each type of data structure, data elements (members) of more than one attributes of the same type of data structure can be contained in the same subtable 29.

(3) Second Embodiment

Figure 3:
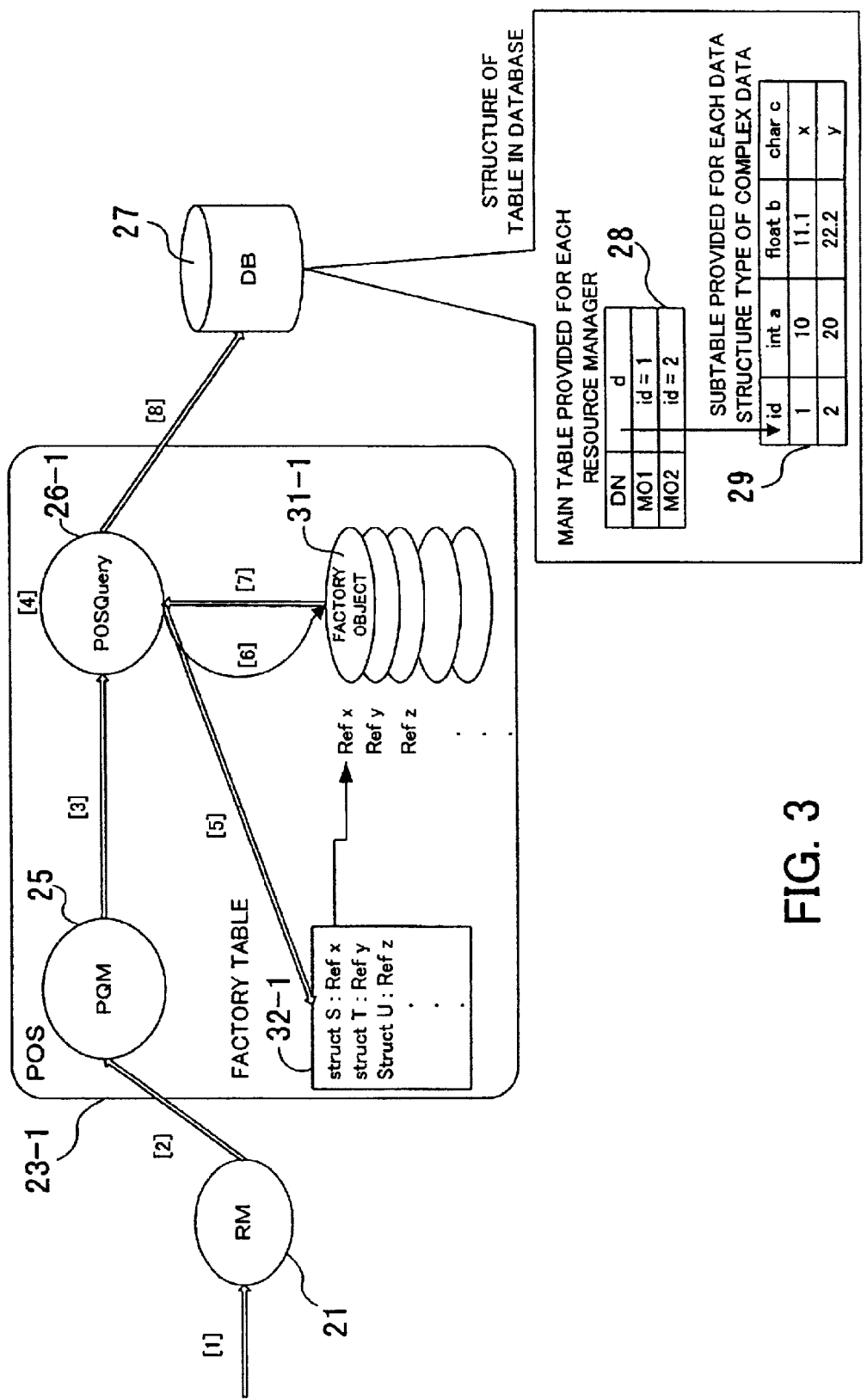
FIG. 3 is a diagram illustrating the construction of the data management apparatus as the second embodiment of the present invention.

FIG. 3 is a diagram illustrating the construction of the data management apparatus as the second embodiment of the present invention. In FIG. 3, elements having the same reference numbers as FIG. 2 function the same as the corresponding elements in FIG. 2. In the construction of FIG. 3, the persistent object service 23-1 includes at least one factory object 31-1 and a factory table 32-1, in addition to the persistent query manager 25 and the POS query object 26-1. The factory object 31-1 is provided for each type of data structure of complex data, and contains information which is necessary for performing manipulation of attributes of the type of data structure, where the manipulation may be any one of types such as generation, deletion, search, and renewal. The factory table 32-1 contains references to factory objects corresponding to the respective types of data structures of complex data. The factory object 31-1 and the factory table 32-1 correspond to the second query unit 15 in FIG. 1.

The operations of the construction of FIG. 3 are explained below. The operations are performed in the order of reference numbers [1] to [8] in FIG. 3.

When the resource manager 21 receives from a client 20 a manipulation request for manipulation of data of an attribute of a managed object [1], the resource manager 21 refers to the NT list 24 for obtaining the type of data structure of the attribute of which manipulation is requested by the manipulation request. Then, the resource manager 21 attaches, to the manipulation request, information on the obtained type of data structure, and sends the manipulation request to the persistent query manager 25 in the persistent object service 23-1 [2]. Next, the persistent query manager 25 passes the manipulation request to the POS query object 26-1, and requests the POS query object 26-1 to perform the manipulation [3]. The POS query object 26-1 determines whether or not the data structure of the attribute of the managed object, of which the manipulation is requested, is a type of complex data (e.g., a structure) [4]. When the POS query object 26-1 determines that the data structure of the attribute of the managed object is a type of complex data (e.g., a structure), the POS query object 26-1 refers to the factory table 32-1 to obtain a reference to one of the at least one factory object 31-1 corresponding to the type of data structure of the attribute of which the manipulation is requested [5]. In the example illustrated in FIG. 3, a reference "Ref x" to one of the at least one factory object 31-1 corresponding to the type "struct S" is obtained.

Next, the POS query object 26-1 calls a method of the factory object 31-1 [6] to which the reference "Ref x" is obtained. The called factory object 31-1 determines a name of a subtable 29 corresponding to the type "struct S", and other information which is necessary for the manipulation type of the requested manipulation, where the information may include basic data types of members of the structure, and other data which is necessary for performing the manipulation. Then, the factory object 31-1 passes the result of the above determination to the POS query object 26-1 [7]. That is, the factory object 31-1 calls a method of the POS query object 26-1 for accessing the subtable 29 corresponding to the type "struct S" in the database system 27. Thus, the called POS query object 26-1 performs the manipulation of the database system 27 [8].

As described above, each factory object 31-1 undertakes processing which is specific to a type of data structure of complex data. That is, the POS query object 26-1 is relieved from load of processing which is specific to each type of data structure, which are performed by each factory object 31-1 corresponding to the type. That is, distributed processing is realized. Therefore, users can define various types of data structure by producing factory objects corresponding to the various types of data structure, and registering references to the factory objects in the factory table 32-1.

(4) Third Embodiment

Figure 4:
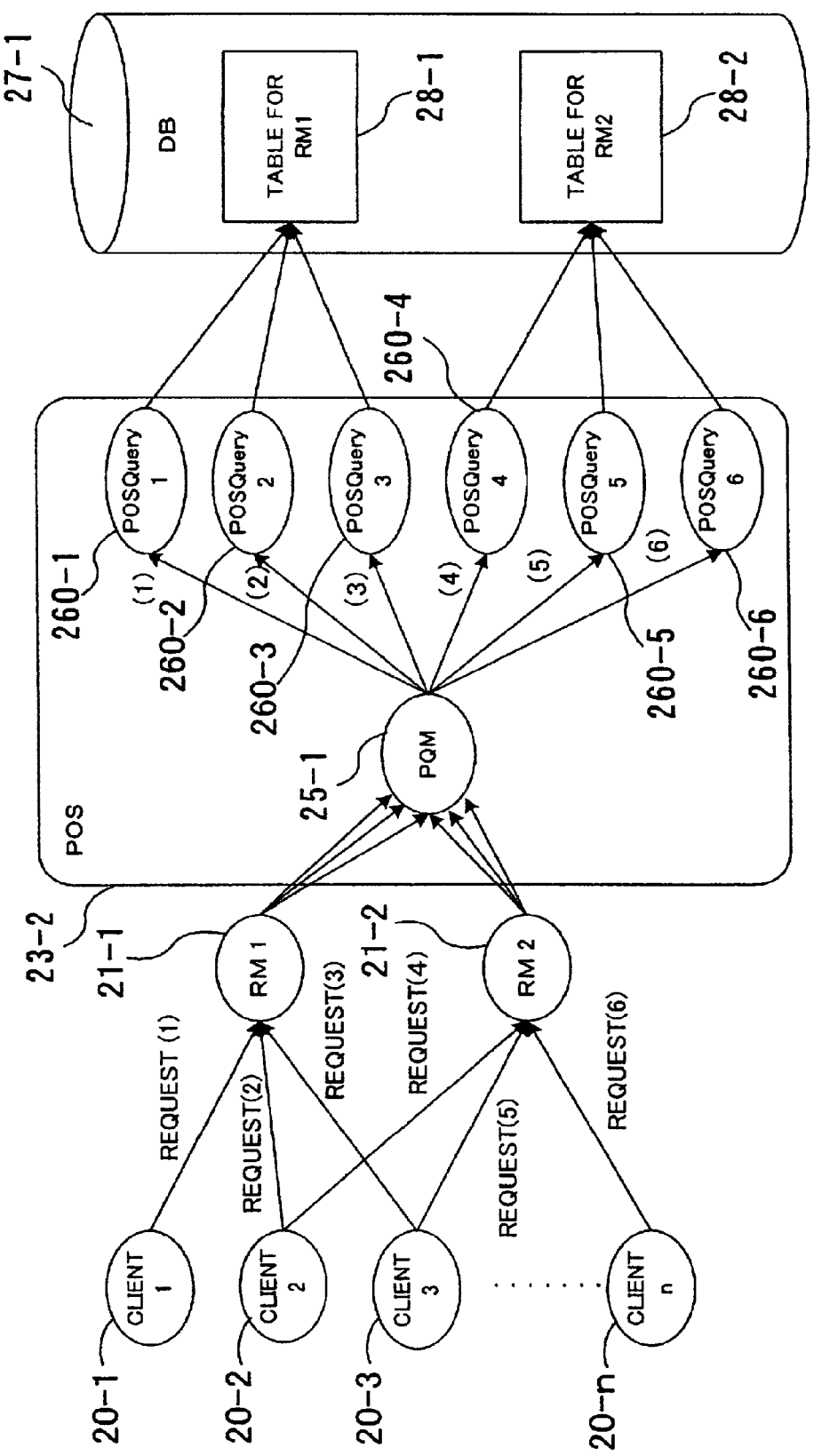
FIG. 4 is a diagram illustrating the construction of the data management apparatus as the third embodiment of the present invention.

FIG. 4 is a diagram illustrating the construction of the data management apparatus as the third embodiment of the present invention. In FIG. 4, elements having the same reference numbers as FIG. 2 function the same as the corresponding elements in FIG. 2. In the construction of FIG. 4, a plurality of resource managers 21-1 and 21-2 are provided, and a plurality of tables 28-1 and 28-2, respectively corresponding to the plurality of resource managers 21-1 and 21-2, are provided in the database system 27-1. In addition, every time when the persistent query manager 25-1 receives a manipulation request from the resource manager 21-1 or 21-2, the persistent query manager 25-1 creates a thread and generates a POS query object 260-1, 260-2, . . . 260-6 for each manipulation request, so that each POS query object 260-1, 260-2, . . . 260-6 can access one of the tables 28-1 and 28-2 corresponding to the resource manager which has received the manipulation request from one of a plurality of clients 20-1, 20-2, . . . 20-n. Due to multithreaded operation by a plurality of POS query objects 260-1, 260-2, . . . 260-6, waiting times can be reduced.

For example, six manipulation requests (1) to (6) from the clients 20-1, 20-2, . . . 20-n may be handled by creating threads and generating six POS query objects 260-1, 260-2, . . . 260-6 respectively corresponding to the six manipulation requests (1) to (6). Each POS query object 260-1, 260-2, . . . 260-6 accesses one of the tables 28-1 and 28-2 corresponding to the resource manager which has received the manipulation request from one of a plurality of clients 20-1, 20-2, . . . 20-n.

Since the plurality of resource managers 21-1 and 21-2 are provided, the plurality of POS query objects can be generated, and the plurality of tables are produced in the database system 27-1, the waiting times can be reduced at the respective stages of the construction of FIG. 4.

Figure 5:
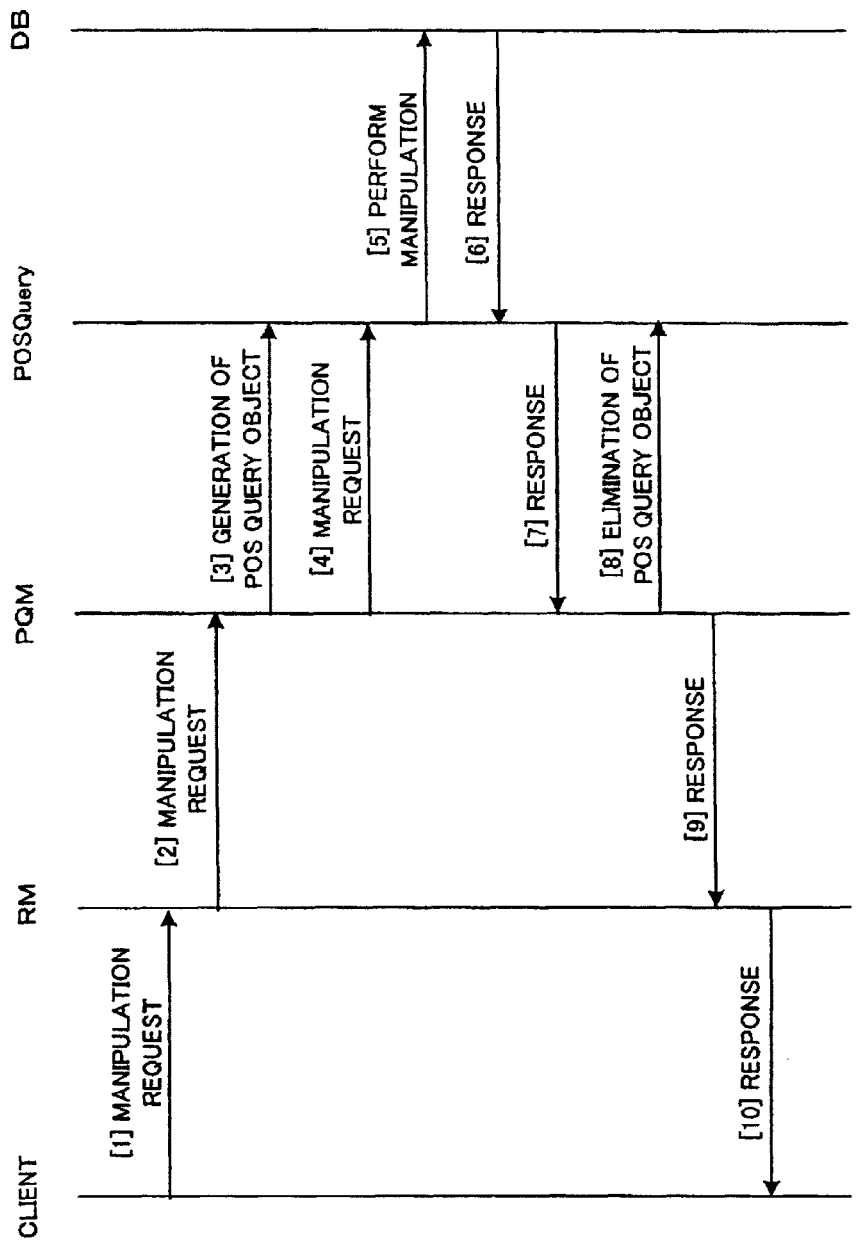
FIG. 5 is a sequence diagram indicating the operations of the data management apparatus as the third embodiment of the present invention.

The operations of the construction of FIG. 4 are explained below with reference to the sequence diagram of FIG. 5. The operations are performed in the order of reference numbers [1] to [10] in FIG. 5.

When each resource manager (RM) 21-1 or 21-2 receives from one of the clients 20-1, 20-2, . . . 20-n a manipulation request for manipulation of data of an attribute of a managed object [1], the resource manager 21-1 or 21-2 passes the manipulation request to the persistent query manager (PQM) 25-1 in the persistent object service (POS) 23-2 [2]. In this case, the resource manager 21-1 or 21-2 may attach information identifying the resource manager to the manipulation request passed to the persistent query manager (PQM) 25-1. Next, the persistent query manager 25-1 generates a POS query object (e.g., the POS query object 260-1) [3], and requests the POS query object 260-1 to perform the manipulation [4]. The POS query object 260-1 accesses the database system 27-1 to perform the manipulation of one of the tables 28-1 and 28-2 corresponding to the resource manager which receives the request for the manipulation [5]. In this case, the table corresponding to the resource manager which receives the request for the manipulation may be determined based on the above-mentioned information identifying the resource manager. Thereafter, the POS query object 260-1 receives from the database system 27-1 a response to the manipulation [6], and transfers the response to the persistent query manager 25-1 [7]. When the persistent query manager 25-1 receives the response, the persistent query manager 25-1 deletes the generated POS query object 260-1 [8], and transfers the response to the resource manager [9]. The resource manager transfers the response to the client [10].

Although not shown, a subtable may be provided for each type of data structure of an attribute, in addition to the above-mentioned tables 28-1 and 28-2 respectively corresponding to the resource managers 21-1 and 21-2.

(5) Fourth Embodiment

Figure 6:
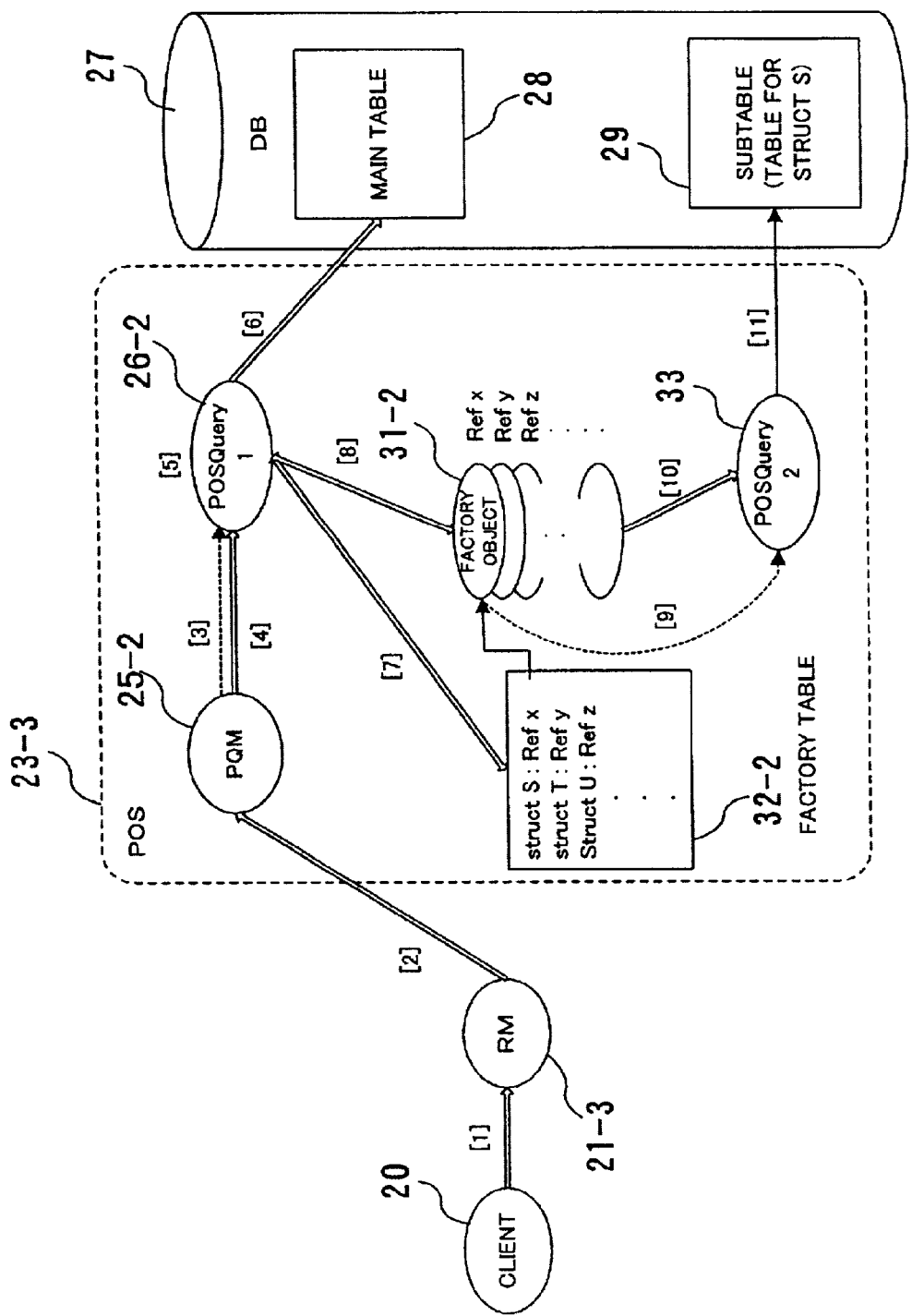
FIG. 6 is a diagram illustrating the construction of the data management apparatus as the fourth embodiment of the present invention.

FIG. 6 is a diagram illustrating the construction of the data management apparatus as the fourth embodiment of the present invention. In FIG. 6, elements having the same reference numbers as FIG. 3 function the same as the corresponding elements in FIG. 3. In the construction of FIG. 6, the resource manager 21-3 receives a manipulation request for manipulation of an attribute of a managed object stored as a persistent object in the database system 27, and passes the manipulation request to the persistent query manager 25-2. When the persistent query manager 25-2 receives the manipulation request, the persistent query manager 25-2 generates a POS query object 26-2. The generated POS query object 26-2 performs manipulation of the main table 28 when manipulation of an attribute of uncomplex data is requested. When manipulation of an attribute of complex data is requested, the generated POS query object 26-2 refers to a factory table 32-2 to obtain a reference to one of a plurality of factory objects 31-2 which is provided for the type of data structure of the attribute, and the factory object 31-2 is called based on the obtained reference to generate a POS query object 33. The generated POS query object 33 performs the requested manipulation of the attribute in the subtable 29 provided for the type of data structure of the attribute. Thus, the processing load imposed on the POS query object 26-2 is further reduced by distributed processing.

In addition, more than one resource manager may be provided in the construction of FIG. 6, and the main table 28 may be provided for each resource manager.

Figure 7:
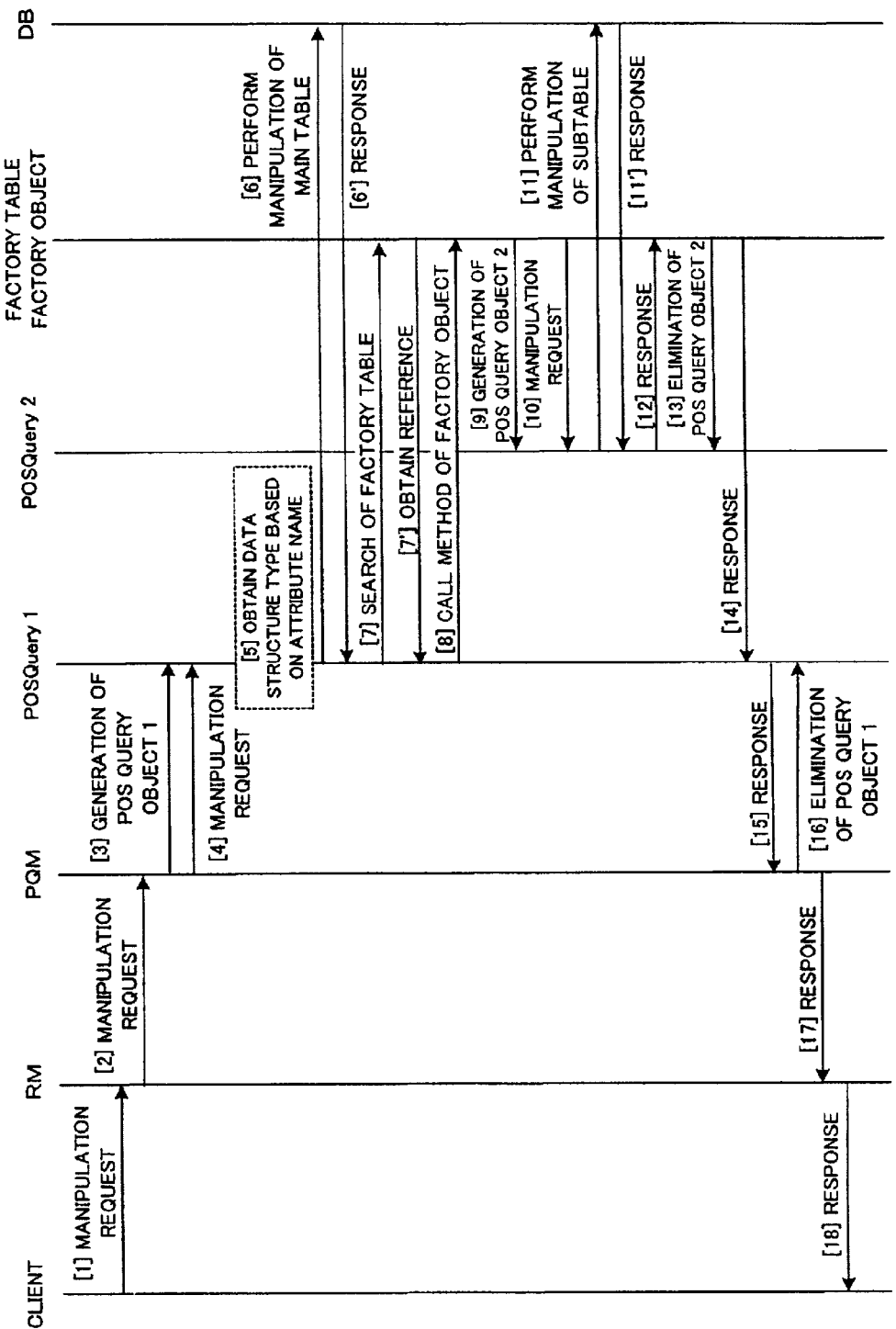
FIG. 7 is a sequence diagram indicating the operations of the data management apparatus as the fourth embodiment of the present invention.

The operations of the construction of FIG. 6 are explained below with reference to the sequence diagram of FIG. 7. The operations are performed in the order of reference numbers [1] to [18] in FIG. 7. In the following explanations, it is assumed that a manipulation request received by the resource manager 21-3 requests for manipulation of data of both an attribute of uncomplex data and another attribute of complex data of a managed object. For example, these attributes may be as follows.

```
int a;
struct S b;
//b : Name of Attribute
// struct S is an arbitrary structure
```

When the resource manager (RM) 21-3 receives from a client 20 a manipulation request for manipulation of data of both an attribute of uncomplex data and another attribute of complex data of a managed object [1], the resource manager 21-3 refers to the NT list 24 for obtaining the types of the data structures of the attributes of which manipulation is requested by the manipulation request. Then, the resource manager 21-3 attaches, to the manipulation request, information on the obtained types of the data structure, and sends the manipulation request to the persistent query manager 25-2 in the persistent object service 23-3 [2]. When the persistent query manager 25-2 receives the manipulation request, the persistent query manager 25-2 generates a POS query object 26-2 [3], and requests the POS query object 26-2 (denoted in FIG. 6 by "POS query 1") to perform the manipulation [4]. The POS query object 26-2 determines whether or not each of the data structures of the attributes of the managed object, of which the manipulation is requested, is a type of complex data (e.g., a structure) [5]. Since one of the above attributes is uncomplex data and the other is complex data, this situation is recognized by the POS query object 26-2. The POS query object 26-2 performs the manipulation of the attribute of the uncomplex data in the main table 28 (corresponding to the resource manager) in the database system 27 [6], and receives a response to the manipulation [6']. On the other hand, for the manipulation of the attribute of complex data, the POS query object 26-2 refers to the factory table 32-2 [7] to obtain a reference to one of the at least one factory object 31-2 corresponding to the type of data structure of the attribute of which the manipulation is requested [7']. In the example illustrated in FIG. 6, a reference "Ref x" to one of the at least one factory object 31-2 corresponding to the type "struct S" is obtained. Next, the POS query object 26-2 requests the above factory object 31-2, to which the reference "Ref x" is obtained, to generate a new POS query object 33 (denoted in FIG. 6 by "POS query 2") [8]. Thus, the factory object 31-2 generates the POS query object 33 [9], and calls a method of the POS query object 33 for performing the manipulation of the attribute of complex data in the subtable 29 [10]. The POS query object 33 performs the manipulation of the attribute of complex data in the subtable 29 [11], and receives from the database system 27 a response to the manipulation [11']. Then, the response is sent to the factory object 31-2 which has generated the POS query object 33 [12]. Since the manipulation of the subtable 29 is completed, the factory object 31-2 deletes the POS query object 33 [13], and transfers the response to the POS query object 26-2 [14]. Thereafter, when the POS query object 26-2 transfers the response to the persistent query manager 25-2 [15], the persistent query manager 25-2 deletes the POS query object 26-2 [16], and transfers the response to the resourse manager 21-3 [17]. The resource manager 21-3 sends the response to the client 20 [18].

Therefore, if a manipulation of both an attribute of uncomplex data and another attribute of complex data is requested by a manipulation request, the manipulation of the attribute of uncomplex data in the main table 28 and the manipulation of the attribute of complex data in the subtable 29 can be performed concurrently, and therefore processing load can be distributed.

(6) Series of Data Elements of Identical Data Type

Data of an attribute of a managed object may be comprised of a series of uncomplex data items of an identical basic data type.

Figure 8:
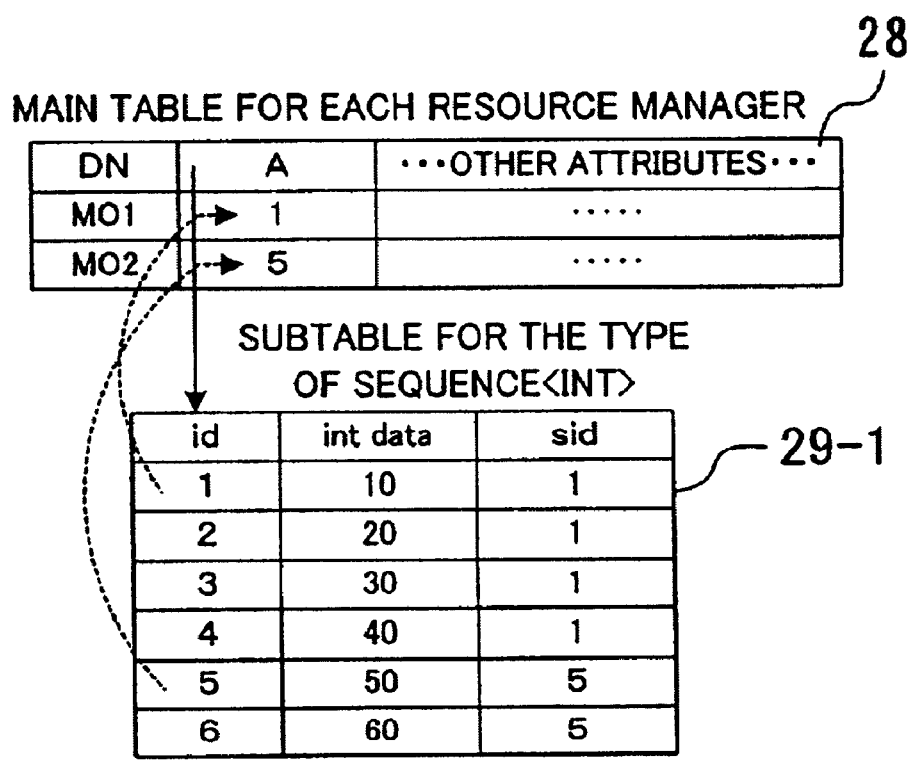
FIG. 8 is a diagram illustrating examples of contents of the main table and the subtable when managed objects contain complex data comprised of a series of data elements of an identical basic data type.

FIG. 8 is a diagram illustrating examples of contents of the main table and the subtable when managed objects contain complex data comprised of a series of data elements of an identical basic data type. In the example of FIG. 8, the managed objects MO1 and MO2 contain attributes which are comprised of a series of integers, as expressed below.

sequence<int>A; //A: the name of the attribute

In this case, a subtable 29-1 is provided for each basic data type of data elements constituting series. As illustrated in FIG. 8, in the subtable 29-1, consecutive identification numbers (id) are assigned to the data elements (rows) of one or more attributes of one or more managed objects, and the identification number assigned to the leading data element of each attribute is assigned as a sequence identification number (sid) to all of the data elements of the attribute. In the main table 28, the basic data type of the attribute of complex data is determined to be an integer type. In addition, the above sequence identification number (sid) assigned to each attribute in the subtable 29-1 is also included as a value of the attribute in the main table 28. Thus, the main table 28 and the subtable 29-1 are related with each other, and management and data processing of any managed object having an attribute of complex data comprised of a series of data elements of an identical basic data type become possible, where the series may have fixed or variable length. For example, the complex data may be one-dimensional variable-length array of a designated basic data type.

When there is a request for acquisition of data of an attribute having a name A of a managed object MO1, the above sequence identification number sid of the attribute is obtained based on the distinguish name (DN) MO1 of the managed object and the name A of the attribute, from the main table 28 corresponding to the resource manager which has received the request. In this example, the acquired sequence identification number sid is "1", which is also a reference to the row of the subtable 29-1 including the leading data element. Since the consecutive identification numbers are assigned to the data elements in the subtable 29-1, all of the data elements of the attribute can be obtained by referring to the successive rows having the same sequence identification number (sid) in turn.

Since the subtable 29-1 is provided for each type of data structure of complex data, each subtable can include complex data of more than one attribute of more than managed object.

Figure 9:
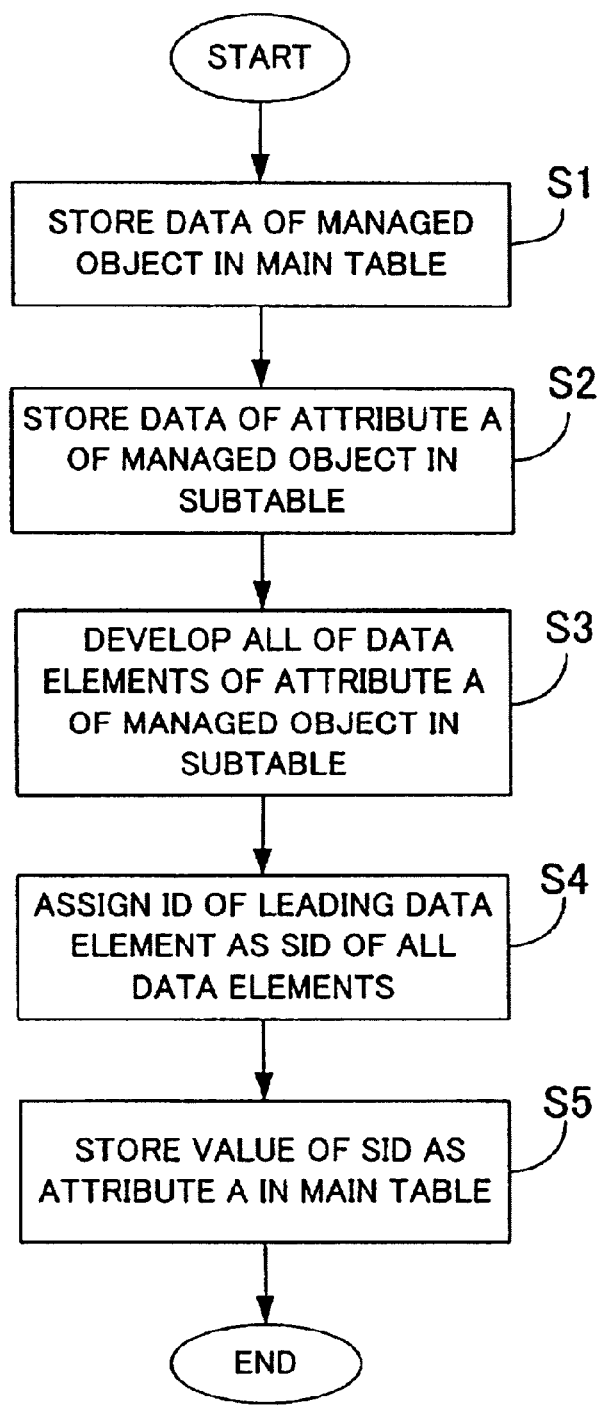
FIG. 9 is a flow diagram illustrating the operation of storing complex data comprised of a series of data elements of an identical basic data type.

FIG. 9 is a flow diagram illustrating the operation of storing complex data comprised of a series of data elements of an identical basic data type. The following explanation is provided for the case wherein data of the attribute A of the third managed object MO3 is added to the data of FIG. 8.

In step S1, all of uncomplex data of the managed object MO3 is written in the main table 28. In step S1, no information is written for the attribute A of complex data in the main table 28. Next, in step S2, data of the attribute A is written in the subtable 29-1. Since the greatest identification number (id) in the example of FIG. 8 is "6", data elements of the attribute A of the third managed object MO3 are written in the subtable 29-1 with the consecutive identification numbers beginning from the identification number "7" in step S3, and the sequence identification number (sid) "7" is written in the subtable 29-1 corresponding to the respective data elements of the attribute A of the managed object MO3 in step S4. Next, in step S5, the sequence identification number (sid) "7" is written in the main table 28.

(7) Series of Data Elements Having Identical Structure

Data of an attribute of a managed object may be comprised of a series of complex data items having an identical type of data structure.

FIG. 10 is a diagram illustrating examples of contents of the main table and the subtable when managed objects contain complex data comprised of a series of structures having an identical data structure. In the example of FIG. 10, it is assumed that each managed object contains complex data comprised of a series of structures having an identical data structure, as declared below.

```
struct S
{
    int a;
    float b;
    char c;
}
typedef sequence<S> SS;
SS B // Data Declaration B: Name of Attribute
```

The main table 28 in FIG. 10 has structure similar to that of FIG. 8. The subtable 29-2 is provided for each type of data structure, and has fields for the respective members of each structure. As illustrated in FIG. 10, in the subtable 29-2, consecutive identification numbers (id) are assigned to the structures of one or more attributes of one or more managed objects, and the identification number id assigned to the leading structure of each attribute is assigned as a sequence identification number (sid) to all of the structures of the attribute. In the main table 28, the data type of the attribute of complex data is determined to be an integer type. In addition, the above sequence identification number (sid) assigned to each attribute in the subtable 29-2 is included as a value of the attribute in the main table 28. Thus, the main table 28 and the subtable 29-2 are related with each other.

When there is a request for acquisition of data of an attribute having a name B of a managed object MO1, the above sequence identification number sid of the attribute is obtained based on the distinguish name (DN) MO1 of the managed object and the name A of the attribute, from the main table 28 corresponding to the resource manager which has received the request. In this example, the acquired sequence identification number sid is "1", which is also a reference to the row of the subtable 29-2 including the leading structure. Since the consecutive identification numbers are assigned to the structures in the subtable 29-2, all of the structures of the attribute can be obtained by referring to the successive rows having the same sequence identification number (sid) in turn.

FIG. 11 is a diagram illustrating examples of contents of the same main table and the same subtable as those of FIG. 10 when managed objects contain complex data comprised of a single structure having an identical data structure. That is, in the case of FIG. 11, complex data of an attribute is comprised of a single structure, e.g., "struct S". In order to distinguish complex data comprised of a single structure from complex data comprised of a series of structures, in the subtable 29-3, the value "0" is written in the field of the sequence identification number sid in each row corresponding to an attribute comprised of a single structure. Thus, the subtable 29-3 in FIG. 11 can concurrently store an attribute comprised of a single structure and an attribute comprised of a plurality of structures. Therefore, it is not necessary to separately provide a subtable for attributes comprised of a single structure and a subtable for attributes comprised of a plurality of structures, the number of necessary subtables can be reduced, and resources can be efficiently used.

(8) Fifth Embodiment

Figure 12:
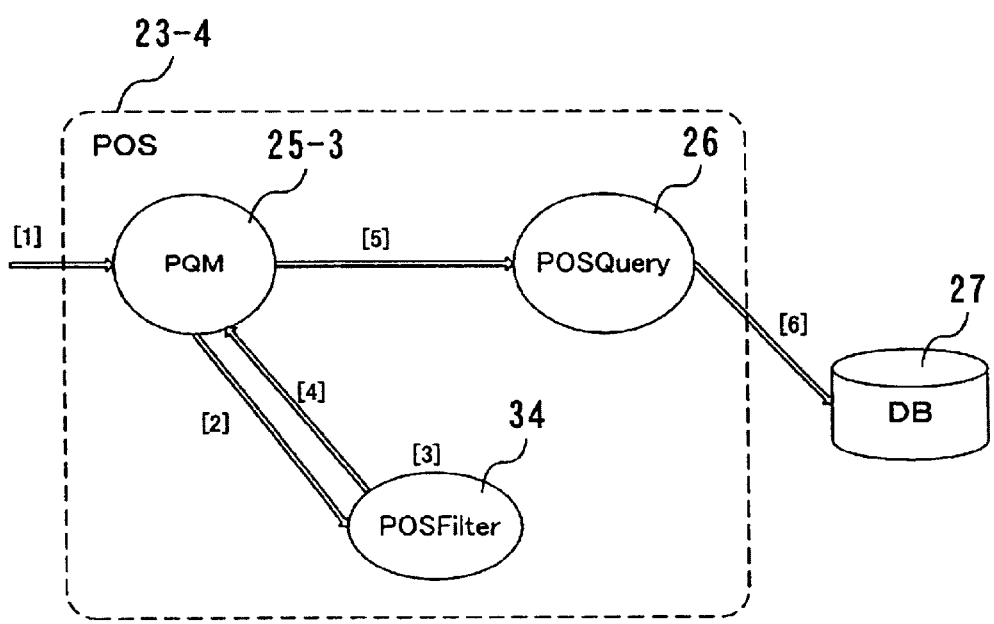
FIG. 12 is a diagram illustrating the construction of the data management apparatus as the fifth embodiment of the present invention.

FIG. 12 is a sequence diagram indicating the operations of the data management apparatus as the fifth embodiment of the present invention. In FIG. 12, elements having the same reference numbers as FIG. 2 function the same as the corresponding elements in FIG. 2. In the construction of FIG. 12, an object having a filtering function for processing a control condition, which is attached to a manipulation request received from a client, is provided so that the manipulation of only a managed object in the database system 27 which satisfies the control condition is performed.

The persistent object service 23-4 comprises the persistent query manager 25-3, the POS query object 26, and a POS filter object 34, which corresponds to the condition translation unit 16 in FIG. 1.

The operations of the construction of FIG. 12 are explained below. The operations are performed in the order of reference numbers [1] to [6] in FIG. 12. In the construction of FIG. 12, the persistent query manager 25-3 in the persistent object service 23-4 receives a manipulation request through the resource manager 21 (not shown) from a client 20 [1], where a manipulation condition is attached to the manipulation request. The manipulation condition is, for example, as follows.

"A=10, where the attribute A is data of an integer type."

When the persistent query manager 25-3 receives the manipulation request with the above manipulation condition [1], the persistent query manager 25-3 passes the manipulation condition to the POS filter object 34 [2]. The POS filter object 34 translates the manipulation condition into a query language which can be recognized by the database system 27 [3]. For example, when the query language is SQL (Structured Query Language), the above manipulation condition is translated as follows.

"where a=10"

Next, the POS filter object 34 returns the translated manipulation condition to the persistent query manager 25-3 [4], and the persistent query manager 25-3 passes the translated manipulation condition to the POS query object 26 [5]. Then, the POS query object 26 performs the manipulation of the database system 27 under the manipulation condition, so that the database system 27 performs the filtering processing in accordance with the manipulation condition [6]. Since the POS filter object 34 translates the manipulation condition into the query language which can be recognized by the database system 27, the client need not care about the language used in the database system.

(9) Sixth Embodiment

Figure 13:
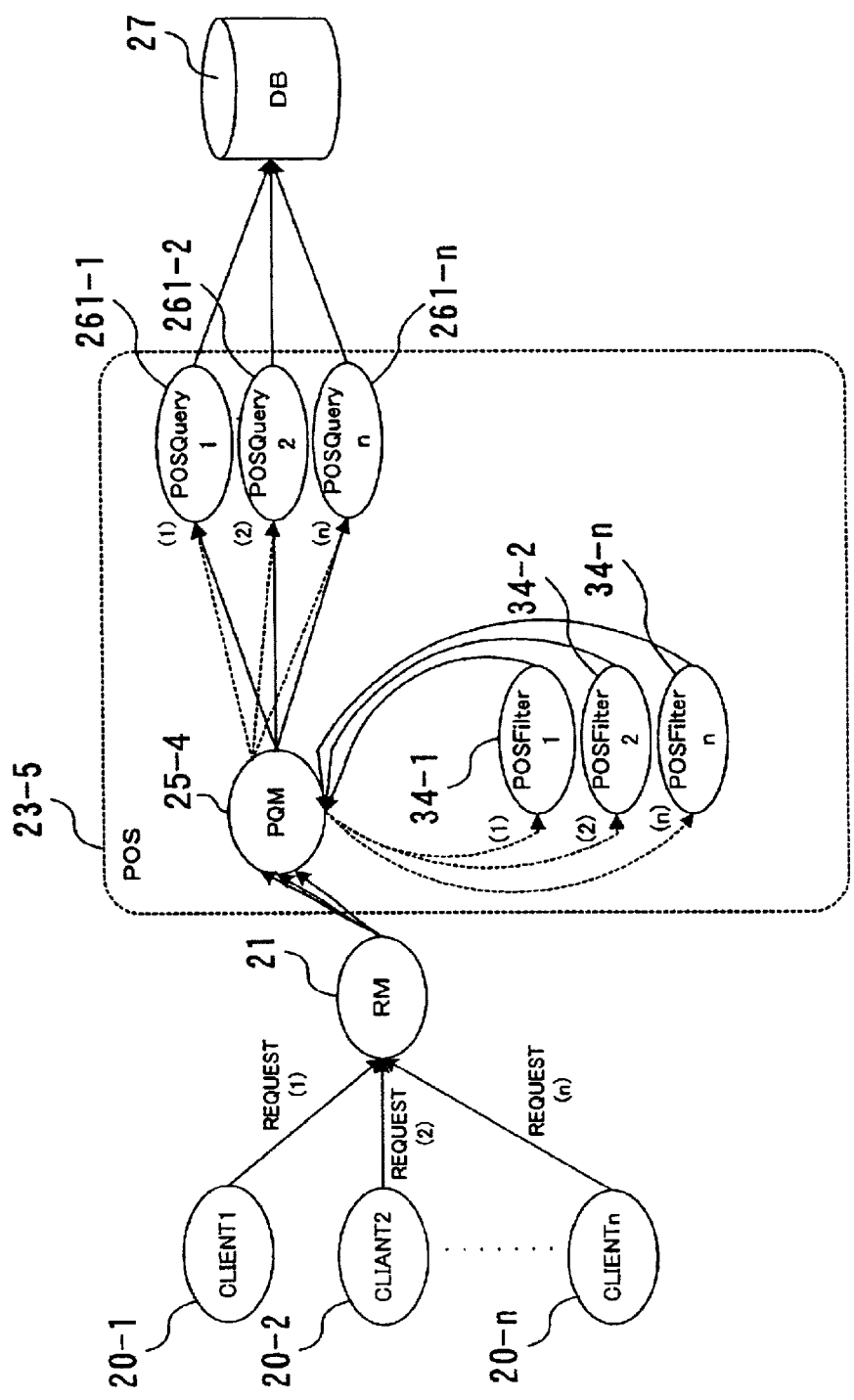
FIG. 13 is a diagram illustrating the construction of the data management apparatus as the sixth embodiment of the present invention.

FIG. 13 is a sequence diagram indicating the operations of the data management apparatus as the sixth embodiment of the present invention. In FIG. 13, elements having the same reference numbers as FIG. 12 function the same as the corresponding elements in FIG. 12. In the construction of FIG. 13, the persistent query manager 25-4 generates a POS filter object 34-1, 34-2, . . . 34-n every time when the persistent query manager 25-4 receives a manipulation request with a manipulation condition.

That is, when the resource manager 21 receives a plurality of manipulation requests (1), (2), . . . (n) from a plurality of clients 20-1, 20-2, . . . 20-n, the resource manager 21 immediately transfers the plurality of manipulation requests to the persistent query manager 25-4. In response to reception of each manipulation request, the persistent query manager 25-4 creates a thread and generates a POS query object 261-1, 261-2, . . . 261-n and a POS filter object 34-1, 34-2, . . . 34-n.

Then, the POS filter objects 34-1, 34-2, . . . 34-n generated in response to each manipulation request translates a manipulation condition attached to the manipulation request into a query language which can be recognized by the database system 27, and returns the translated manipulation condition to the persistent query manager 25-4. The persistent query manager 25-4 passes the manipulation request with the translated manipulation condition, to the POS query object 261-1, 261-2, . . . 261-n generated in response to the manipulation request. Then, the POS query object 261-1, 261-2, . . . 261-n performs the manipulation of the database system 27 under the manipulation condition. Since a POS filter object 34-1, 34-2, . . . 34-n is generated in response to reception of each manipulation request, the persistent query manager 25-4 need not wait for completion of processing for a preceding manipulation request in the POS filter object.

(10) Seventh Embodiment

Figure 14:
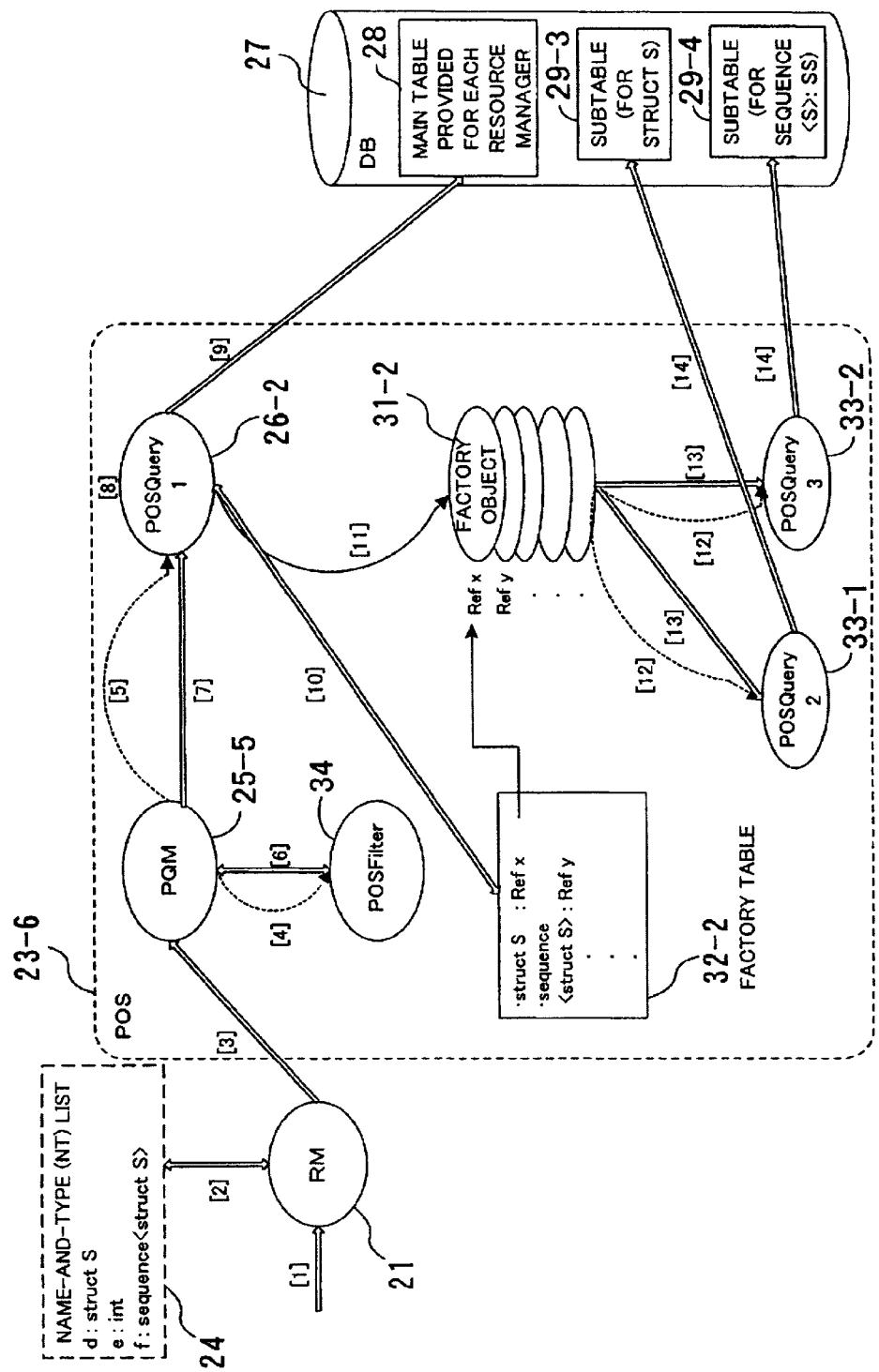
FIG. 14 is a diagram illustrating the construction of the data management apparatus as the seventh embodiment of the present invention.
Figure 15:
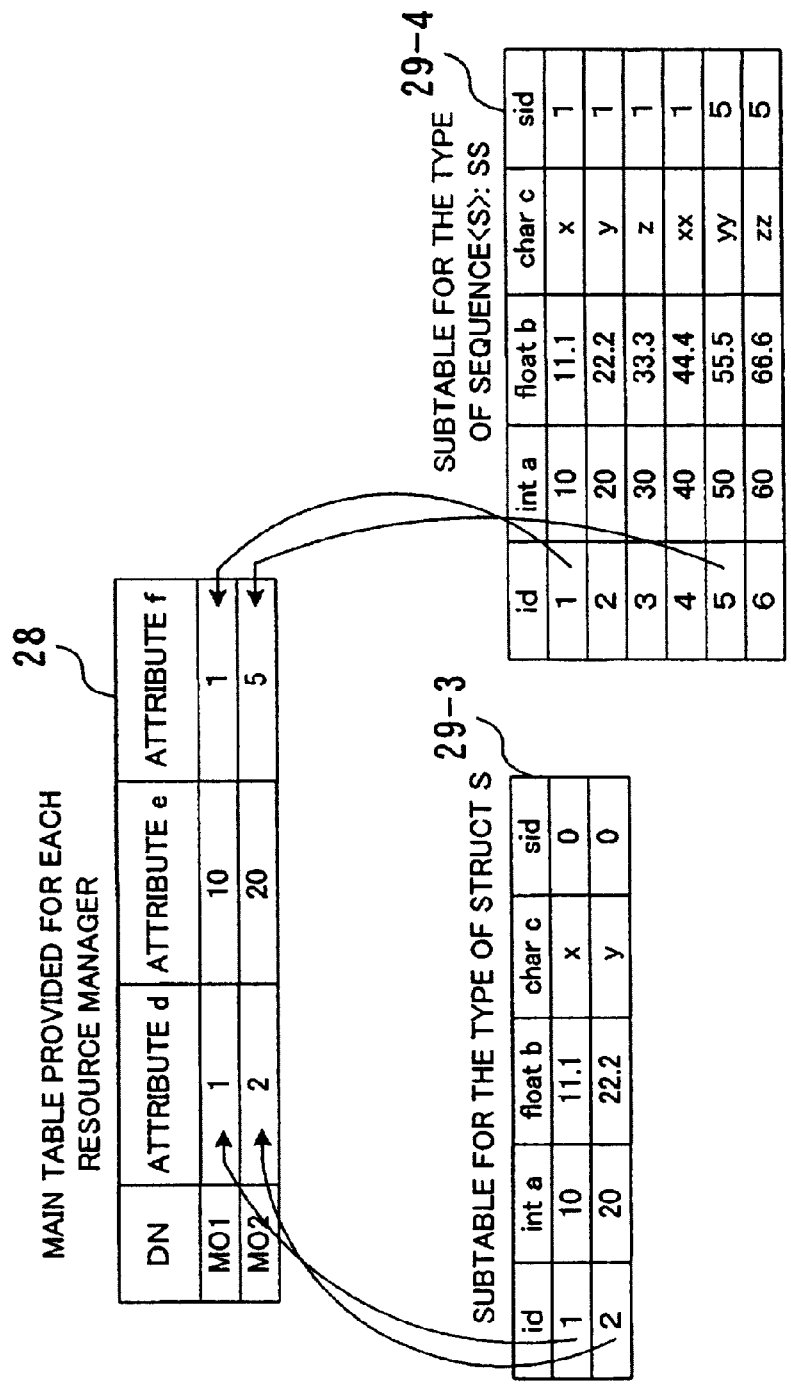
FIG. 15 is a diagram illustrating examples of contents of the main table and the subtables in the seventh embodiment of the present invention.

FIG. 14 is a sequence diagram indicating the operations of the data management apparatus as the seventh embodiment of the present invention. In FIG. 14, elements having the same reference numbers as FIGS. 2, 6, and 12 function the same as the corresponding elements in FIGS. 2, 6, and 12. In the construction of FIG. 14, the persistent object service 23-6 comprises the persistent query manager 25-5, the POS filter object 34, the factory table 32-2, the factory object 31-2, and POS query objects 33-1 and 33-2. The NT list 24 in the resource manager 21 includes the names and the types of data structures of attributes of complex data, and the factory table 32-2 contains references to factory objects 31-2 corresponding to the respective types of data structures of complex data. The database system 27 contains a main table 28 corresponding to each resource manager and a subtable 29-3 and 29-4 for each type of data structure of complex data. FIG. 15 is a diagram illustrating examples of contents of the main table 28 and the subtables 29-3 and 29-4 in the seventh embodiment of the present invention.

The operations of the construction of FIG. 14 are explained below. The operations are performed in the order of reference numbers [1] to [14] in FIG. 14. In the example of FIGS. 14 and 15, it is assumed that each managed object contains complex data comprised of a single structure and complex data comprised of a series of structures having an identical data structure as declared below.

```
struct S
{
    int a;
    float b;
    char c;
}
typedef sequence<S> SS;
S      d; // d: Name of Attribute
int    e; // e: Name of Attribute
SS     f; // f: Name of Attribute
```

In addition, it is assumed that a manipulation condition "e=20" is attached to the manipulation request.

When the resource manager 21 receives from a client 20 a manipulation request for manipulation of data of two attributes of a managed object [1], the resource manager 21 refers to the NT list 24 for obtaining types of data structure of the attributes of which manipulations are requested by the manipulation request [2]. Then, the resource manager 21 attaches, to the manipulation request, information on the obtained types of data structure, and sends the manipulation request to the persistent query manager 25-5 in the persistent object service 23-6 [3]. When the persistent query manager 25-5 receives the manipulation request, the persistent query manager 25-5 generates a POS filter object 34 [4] and a POS query object 26-2 (denoted in FIG. 14 by "POS query 1") [5].

Thereafter, the persistent query manager 25-5 passes the manipulation condition to the POS filter object 34, by which the manipulation condition is translated into a query language which can be recognized by the database system 27. For example, when the query language is SQL, the aforementioned manipulation condition "e=20" is translated as follows.

"where e=20"

Then, the translated manipulation condition is returned to the persistent query manager 25-5 [6], and the persistent query manager 25-5 passes information on the manipulation request, including the names and types of data structure of the attributes, the manipulation condition, and the like, to the POS query object 26-2 [7]. When the POS query object 26-2 receives the information, the POS query object 26-2 determines whether or not the data structure of each attribute of the managed object, of which the manipulation is requested, is a type of complex data (e.g., a structure) [8]. If the POS query object 26-2 determines that the data structure of the attribute is a type of uncomplex data (e.g., integer, floating point, or character), the POS query object 26-2 performs the manipulation of the attribute in the main table 28 (corresponding to the resource manager) in the database system 27 [9].

However, in this example, the attributes of which the manipulation is requested are complex data. Therefore, the POS query object 26-2 refers to the factory table 32-2 [10] to obtain a reference to one of the at least one factory object 31-2 corresponding to the type of data structure of the attribute of which the manipulations are requested. Since the manipulation request includes a request for manipulations of two attributes of the type "struct S" and the type "sequence <struct S>", a reference "Ref x" to one of the at least one factory object 31-2 corresponding to the type "struct S" and a reference "Ref y" to another of the at least one factory object 31-2 corresponding to the type "sequence <struct S>" are obtained from the factory table 32-2.

Thereafter, the POS query object 26-2 calls [11] methods corresponding to the requested manipulations, which are defined in the factory objects 31-2 to which the references "Ref x" and "Ref y" are obtained. Then, the POS query object 26-2 requests the factory objects 31-2 to respectively generate new POS query objects 33-1 and 33-2 (respectively denoted in FIG. 14 by "POS query 2" and "POS query 3") [12]. Then, the POS query objects 33-1 and 33-2 receive manipulation requests from the corresponding factory objects 31-2, respectively [13], and perform the manipulations of the subtables 29-3 and 29-4 respectively corresponding to the above-mentioned types of data structure of the attributes [14]. Thereafter, the responses to the manipulations are returned from the database system 27 to the POS query objects 33-1 and 33-2, and are then transferred through the corresponding factory objects 31-2 to the POS query object 26-2. When the POS query object 26-2 obtains all of the responses to the requested manipulations, the responses are transferred through the persistent query manager 25-5 and the resource manager 21 to the client 20.

(11) Eighth Embodiment

Figure 16:
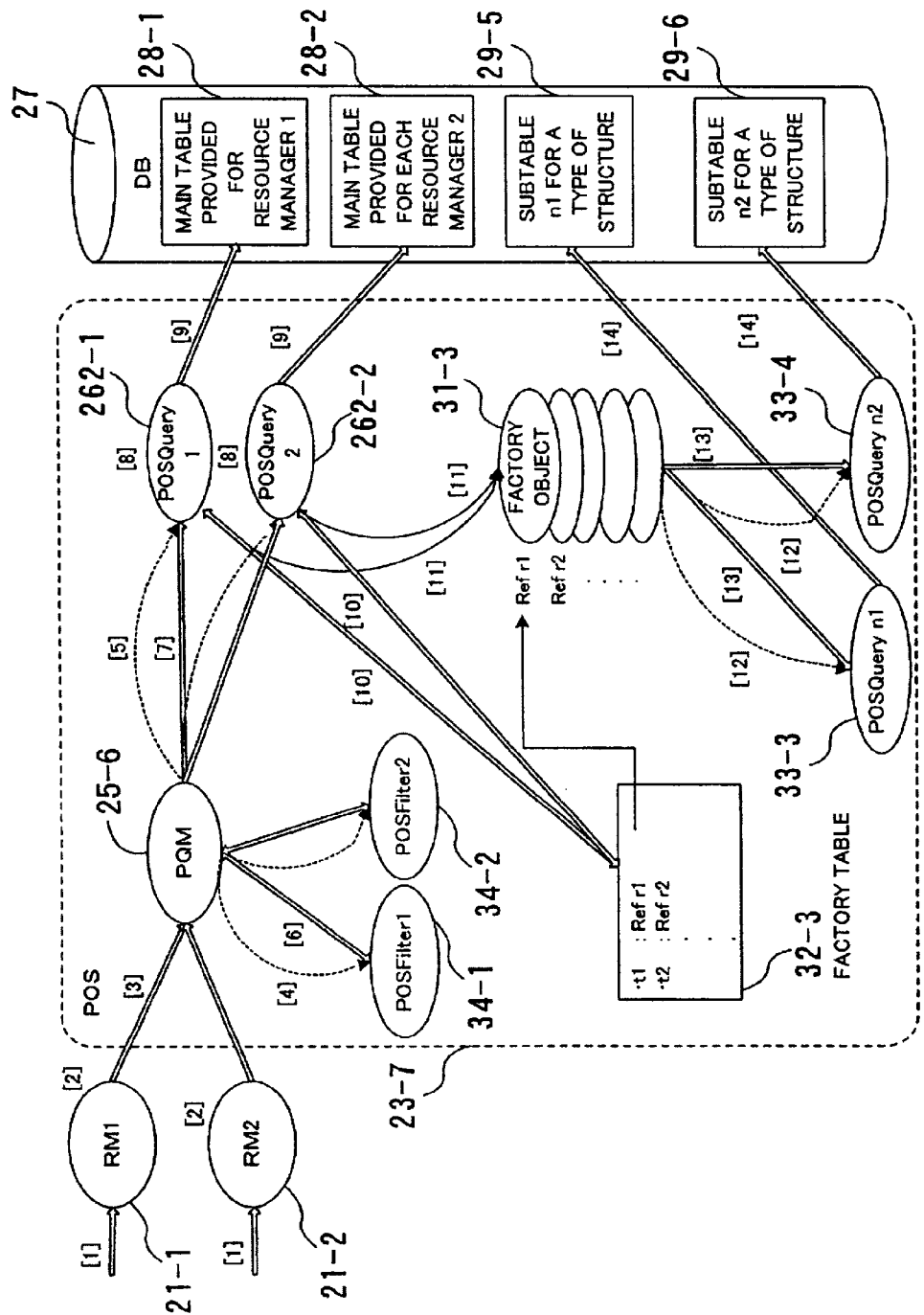
FIG. 16 is a diagram illustrating the construction of the data management apparatus as the eighth embodiment of the present invention.

FIG. 16 is a sequence diagram indicating the operations of the data management apparatus as the eighth embodiment of the present invention. In FIG. 16, elements having the same reference numbers as FIGS. 2, 4, 6, and 13 function the same as the corresponding elements in FIGS. 2, 4, 6, and 13. In the construction of FIG. 16, a POS filter object and a POS query object which performs manipulation of a main table are generated for each manipulation request.

The operations of the construction of FIG. 16 are explained below. The operations are performed in the order of reference numbers [1] to [14] in FIG. 16.

When each of the resource managers 21-1 and 21-2 receives from one of a plurality of clients 20 a manipulation request for manipulation of an attribute of a managed object [1], each of the resource managers 21-1 and 21-2 refers to the NT list 24 to obtain the type of data structure of the attribute of which manipulation is requested by the manipulation request [2]. Then, each of the resource managers 21-1 and 21-2 attaches, to the manipulation request, information on the obtained types of data structure, and sends the manipulation request to the persistent query manager 25-6 in the persistent object service 23-7 [3]. When the persistent query manager 25-6 receives the manipulation request, the persistent query manager 25-6 generates for each manipulation request a POS filter object 34-1 or 34-2 [4] and a POS query object 262-1 or 262-2 ("POS query 1" or "POS query 2") [5].

Thereafter, the persistent query manager 25-6 passes a manipulation condition, which is included in each manipulation request, to the POS filter object 34-1 or 34-2 corresponding to the manipulation request. Each POS filter object 34-1 or 34-2 translates the manipulation condition for each manipulation request, into a query language which can be recognized by the database system 27. Then, the translated manipulation condition for each manipulation request is returned to the persistent query manager 25-6 [6]. The persistent query manager 25-6 passes information on each manipulation request, including the name and the type of data structure of the attribute, the manipulation condition, and the like, to the corresponding POS query object 262-1 or 262-2 [7]. When each of the POS query objects 262-1 and 262-2 receives the information, each of the POS query objects 262-1 and 262-2 determines whether or not the data structure of the attribute of the managed object, of which the manipulation is requested by the corresponding request, is a type of complex data (e.g., a structure) [8]. When each of the POS query objects 262-1 and 262-2 determines that the data structure of the attribute of the managed object is a type of uncomplex data (e.g., integer, floating point, or character), the POS query object performs the manipulation of the attribute in the main table 28-1 or 28-2 (corresponding to the resource manager) in the database system 27 [9].

On the other hand, when each of the POS query objects 262-1 and 262-2 determines that the data structure of the attribute of the managed object is a type of complex data (e.g., a structure), the POS query objects 262-1 and 262-2 refer to the factory table 32-3 [10] to obtain a reference to one of the at least one factory object 31-3 corresponding to the type of data structure of the attribute of which the manipulation is requested by the corresponding manipulation request. Thereafter, each of the POS query objects 262-1 and 262-2 calls [11] a method corresponding to the requested manipulation, which are defined in the factory object 31-3 determined based on the above reference. Then, each of the POS query objects 262-1 and 262-2 requests the factory object 31-3 to generate a new POS query object 33-3 or 33-4 ("POS query n1" and "POS query n2") [12]. Thereafter, each of the POS query objects 33-3 and 33-4 receives a manipulation request from the corresponding factory object 31-3 [13], and performs the manipulation of one of the subtables 29-5 and 29-6 corresponding to the types of data structure of the attribute of which the manipulation is requested by the corresponding manipulation request [14].

(12) Ninth Embodiment

Figure 17:
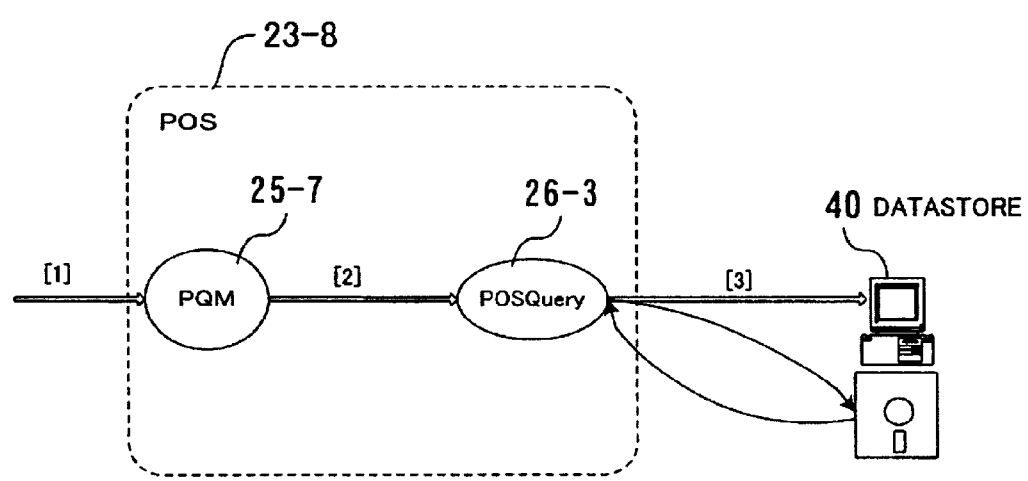
FIG. 17 is a sequence diagram indicating the operations of the data management apparatus as the ninth embodiment of the present invention.
Figure 18:
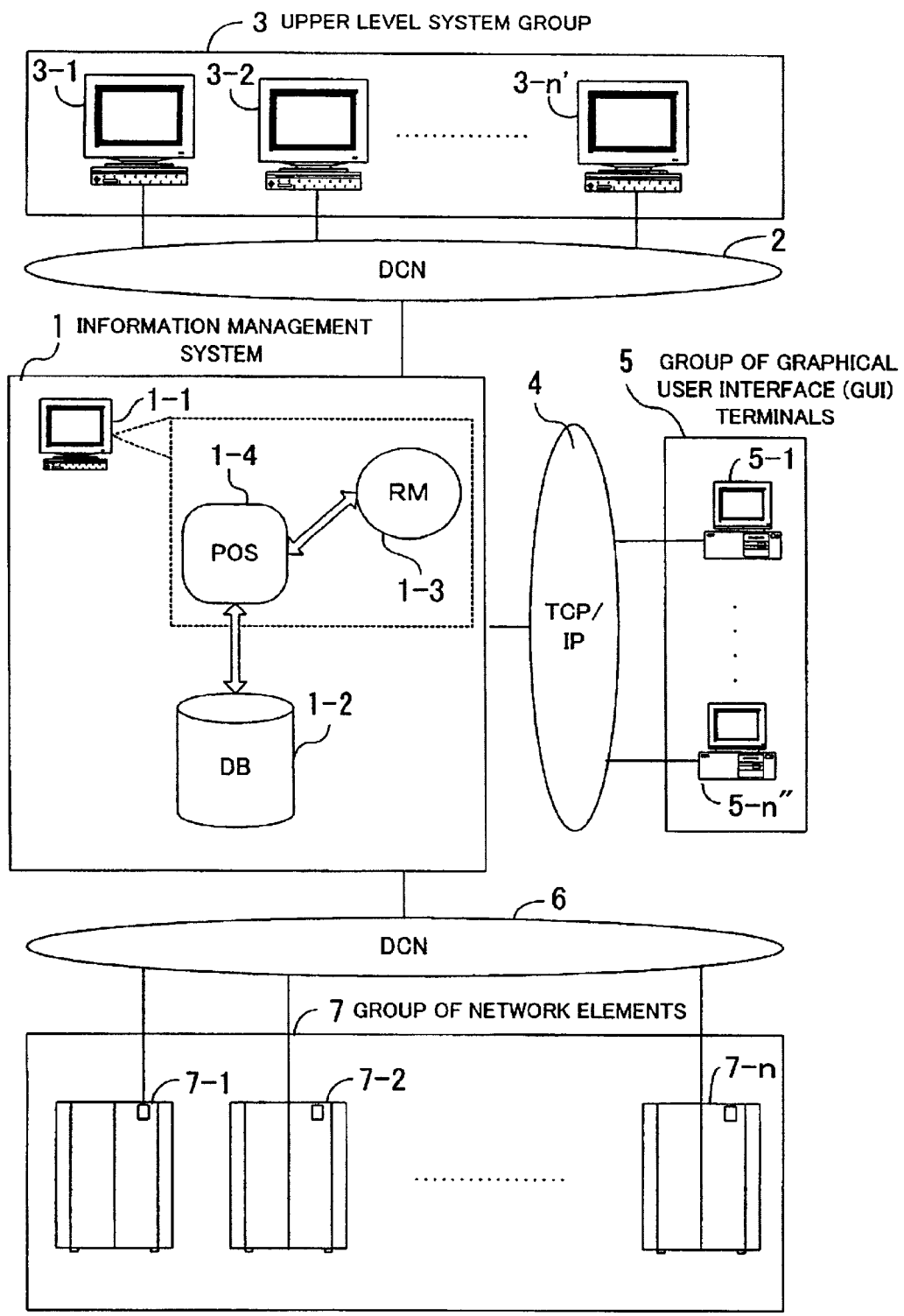
FIG. 18 is a diagram illustrating an outline of an information management system in which the data management apparatus according to the present invention can be used.

FIG. 17 is a sequence diagram indicating the operations of the data management apparatus as the ninth embodiment of the present invention. In FIG. 17, elements having the same reference numbers as FIG. 2 function the same as the corresponding elements in FIG. 2. In the ninth embodiment, managed objects are stored in a data storing system 40 other than database systems. For example, the data storing system 40 may be a file in a server. In addition, the persistent object service 23-8 comprises a persistent query manager 25-7 and a POS query object 26-3. Although not shown, the data management apparatus of the ninth embodiment comprises the same resource manager 21 (not shown) as the first embodiment (FIG. 2).

The operations of the construction of FIG. 17 are explained below. The operations are performed in the order of reference numbers [1] to [3] in FIG. 17.

It is assumed that the resource manager 21 receives from a client a manipulation request with a manipulation condition "A=10", where A is an attribute of an integer type. When the resource manager 21 receives the manipulation request, the resource manager 21 passes the manipulation request to the persistent query manager 25-7 in the persistent object service 23-8 [1]. Then, the persistent query manager 25-7 passes the manipulation request including the manipulation condition (A="10") to the POS query object 26-3 [2]. The POS query object 26-3 analyzes the manipulation condition, and performs filtering processing on the data storing system 40 in accordance with the manipulation condition, and performs manipulation of the data storing system 40 [4]. That is, the POS query object 26-3 per se performs the filtering processing on the data storing system 40. Therefore, even if the data storing system does not have a filtering function, it is possible to obtain from the data storing system a response in accordance with the manipulation condition.

Even if the data storing system is changed to a new one, it is not necessary to greatly change the resource manager and the persistent object service 23-8, and it is sufficient to provide the POS query object 26-3 with an interface with the new data storing system.

(13) Recording Medium Storing Program

A computer-readable medium may store a program which, when used with a computer, is able to output control information which directs the computer to realize any of the above data management apparatuses as the first to ninth embodiments. The computer-readable medium may be a semiconductor storage device such as a ROM, a magnetic storage medium such as a floppy disc or a hard disk, or a CD-ROM, a CD-R, a DVD-ROM, a DVD-RAM, a DVD-R, or the like. Further, the computer-readable medium may be a programmed hardware logic circuit such as a custom LSI. The above computer-readable medium storing the program can be put into the market. Otherwise, the program data may be transferred through a communication network from a storage device included in a computer system to another computer system. When executing the program in a computer system, for example, the program stored in a hard disk drive may be loaded in a main memory of the computer system.

(14) Advantages

As described above, in the various embodiments of the present invention, the database system or data storing system contains a main table for storing uncomplex data and a subtable provided for storing complex data of each data structure type. The resource manager is required to have only information on data structure types of attributes, and one or more POS query objects access the main table or the subtable according to the complexity of the attribute of which manipulation is requested. Therefore, even if manipulation of complex data is requested, the resource manager need not care about data elements of complex data, and processing load imposed on the resource manager is reduced. Thus, the resource manager can efficiently handle a plurality of manipulation requests from a plurality of clients, and the performance of the data management apparatus can be enhanced.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

In addition, all of the contents of the Japanese patent application, No.11-204010 are incorporated into this specification by reference.

What is claimed is:

1. A data management apparatus for managing at least one managed object stored as at least one persistent object in a data storing system, comprising:

a complexity information holding unit which holds information on complexity of data of each of at least one attribute of the at least one managed object;

a first request receiving unit which receives a request for manipulation of data of one of the at least one attribute of the at least one managed object;

a complex data determining unit which refers to said complexity information holding unit to determine whether or not said data of said one of the at least one attribute is complex data; and a manipulation performing unit which performs said manipulation requested by said request on a first table when said data of said one of the at least one attribute of which said manipulation is requested by said request is not complex data, and performs said manipulation requested by said request on a second table when said data of said one of the at least one attribute of which said manipulation is requested by said request is complex data;

said first table contains uncomplex data included in said at least one managed object, said second table contains complex data included in said at least one managed object, said uncomplex data and said complex data being segregated from each other in said first table and said second table, respectively, and the first and second tables are stored in said data storing system, the first and second tables including an identifier of said complex data, every one of said at least one persistent object including at least a portion of said complex data other than said identifier of said complex data.

2. A data management apparatus according to claim 1, wherein said second table is provided for each type of structure of said complex data.

3. A data management apparatus according to claim 1, wherein said manipulation performing unit translates said request into a query language which can be recognized by a database system when said data storing system is realized by the database system.

4. A data management apparatus according to claim 1, wherein an identifier is assigned to each of the at least one attribute of the at least one managed object when said each of the at least one attribute contains complex data, and said first and second tables are related with each other by using said identifier.

5. A data management apparatus according to claim 1, wherein said manipulation performing unit comprises a first manipulation unit which performs said manipulation requested by said request on said first table, and a second manipulation unit which performs said manipulation requested by said request on said second table.

6. A data management apparatus according to claim 1, further comprising, at least one manipulation object each of which is provided for a specific type of data structure of complex data, and assists said manipulation performing unit in the manipulation when said one of said at least one attribute contains complex data having the specific type of data structure, and a manipulation object table which indicates one of the at least one manipulation object for use in manipulation of complex data of an attribute having each data structure.

7. A data management apparatus according to claim 1, further comprising a generation unit which creates a thread, and generates a manipulation unit as a portion of said manipulation performing unit when one of said first and at least one second request receiving units receives a request for manipulation on an attribute of one of the at least one managed object, where said manipulation unit performs the manipulation of the attribute of one of the at least one managed object.

8. A data management apparatus according to claim 1, further comprising a generation unit which generates said manipulation performing unit when said first request receiving unit receives said request.

9. A data management apparatus according to claim 8, wherein said manipulation performing unit comprises, at least one manipulation object each of which is provided for a specific type of data structure of complex data, and performs said manipulation when said one of said at least one attribute contains complex data having the specific type of data structure, and a manipulation object table which indicates one of the at least one manipulation object for use in manipulation of complex data of an attribute having each data structure.

10. A data management apparatus according to claim 1, further comprising at least one second request receiving unit each of which receives a request for manipulation of one of the at least one attribute of the at least one managed object, and said first and at least one second request receiving units receive the requests from a plurality of clients.

11. A data management apparatus according to claim 1, wherein said first table is provided corresponding to each of the first and at least one second request receiving units.

12. A data management apparatus according to claim 1, further comprising a condition translation unit which translates information on a condition on said manipulation into a query language which can be recognized by a database system when said data storing system is realized by the database system, and the condition is included in the request received by the first request receiving unit.

13. A data management apparatus according to claim 1, further comprising a generation unit which generates a condition translation unit when said request includes information on a condition on the manipulation requested to be performed on said one of the at least one managed object, where the condition translation unit translates the information on the condition into a query language which can be recognized by a database system when said data storing system is realized by the database system.

14. A data management apparatus according to claim 1, further comprising a filter processing unit which performs a filtering operation on the data stored in said data storing system, based on a condition on said manipulation, when said data storing system is not realized by the database system, and the condition is included in the request received by the first request receiving unit.

15. A data storage and management process for storing and managing data of at least one attribute of at least one object as at least one persistent object in a data storing system, comprising the steps of:

(a) receiving a request for storing said data of the at least one attribute of the at least one object;

(b) recording information on complexity of data of each of the at least one attribute of the at least one object; and (c) storing the data of said each of the at least one attribute of the at least one object in a first table in the data storing system when the data of said each of the at least one attribute of the at least one object is not complex data, and storing the data of said each of the at least one attribute of the at least one object in a second table in the data storing system when the data of said each of the at least one attribute of the at least one object is complex data, the first and second tables including an identifier of said complex data, said not complex data and said complex data being segregated from each other in said first table and said second table, respectively, every one of said at least one persistent object including at least a portion of said complex data other than said identifier of said complex data.

16. A data storage and management process for storing and managing complex data of an attribute of at least one object as at least one persistent object in a data storing system, where the complex data is comprised of a plurality of data elements having an identical data type, said process comprising the steps of:

(a) storing an identifier of said complex data instead of said attribute of said at least one object in a first table; and (b) storing said plurality of data elements with said identifier of said complex data in a second table, said plurality of data elements not pointing to a location of any of said at least one object, every one of said at least one persistent object including at least a portion of said complex data other than said identifier of said complex data.

17. A data storage and management process according to claim 16, wherein said plurality of data elements are stored in the second table successively with consecutive numbers.

18. A data storage and management process for storing and managing a data set being comprised of at least one complex data item having identical data structure, as an attribute of at least one persistent object, in a data storing system, where each of the at least one complex data item is comprised of a plurality of data elements each having a data type, said process comprising the steps of:

(a) storing an identifier of said data set instead of said attribute of said at least one persistent object in a first table; and (b) storing said plurality of data elements of the at least one complex data item of the data set with said identifier of said data set in a second table which is provided for each data structure, said plurality of data elements not pointing to a location of any of said at least one object, every one of said at least one persistent object including at least a portion of said at least one complex data item other than said identifier of said data set.

19. A data storage and management process according to claim 18, wherein said at least one complex data item is stored in the second table successively, together with at least one consecutive number assigned to the at least one complex data item.

20. A data storage and management process according to claim 18, wherein said at least one complex data item is stored in the second table with a value indicating that the at least one complex data item includes only one complex data item, when the number of the at least one complex data item is one.

21. A data management apparatus for managing data of at least one object stored as at least one persistent object in a data storing system which has no available filtering function comprising:

a resource management unit which functions as an interface with a client application, and receives a request for manipulation of said data of said at least one object, from the client application, where said request includes information on a filtering condition which is to be satisfied in the manipulation; and a manipulating unit which performs the manipulation of said data of said at least one object, where the manipulation includes a filtering operation in accordance with said filtering condition;

said data comprising not complex data and complex data, said not complex data and said complex data being segregated from each other in a first table and a second table, respectively, said first table and said second table including an identifier of said complex data, every one of said at least one persistent object including at least a portion of said complex data other than said identifier of said complex data.

22. A product for use with a data management apparatus for managing at least one managed object stored as at least one persistent object in a data storing system, said product, when used with said data management apparatus, is able to output control information which directs the data management apparatus to comprise:

a complexity information holding unit which holds information on complexity of data of each of at least one attribute of the at least one managed object;

a first request receiving unit which receives a request for manipulation of data of one of the at least one attribute of the at least one managed object;

a complex data determining unit which refers to said complexity information holding unit to determine whether or not said data of said one of the at least one attribute is complex data; and a manipulation performing unit which performs said manipulation requested by said request on a first table when said data of said one of the at least one attribute of which said manipulation is requested by said request is not complex data, and performs said manipulation requested by said request on a second table when said data of said one of the at least one attribute of which said manipulation is requested by said request is complex data;

said first table contains uncomplex data included in said at least one managed object, said second table contains complex data included in said at least one managed object, said uncomplex data and said complex data being segregated from each other in said first table and said second table, respectively, and the first and second tables are stored in said data storing system, the first and second tables including an identifier of said complex data, every one of said at least one persistent object including at least a portion of said complex data other than said identifier of said complex data.

23. A product for use with a data management apparatus for storing and managing data of at least one attribute of at least one object as at least one persistent object in a data storing system, said product, when used with said data management apparatus, is able to output control information which directs the data management apparatus to execute a process comprising the steps of:

(a) receiving a request for storing said data of the at least one attribute of the at least one object;

(b) recording information on complexity of data of each of the at least one attribute of the at least one object; and (c) storing the data of said each of the at least one attribute of the at least one object in a first table in the data storing system when the data of said each of the at least one attribute of the at least one object is not complex data, and storing the data of said each of the at least one attribute of the at least one object in a second table in the data storing system when the data of said each of the at least one attribute of the at least one object is complex data;

said not complex data and said complex data being segregated from each other in said first table and said second table, respectively, said first table and said second table including an identifier of said complex data, every one of the at least one persistent object including at least a portion of said complex data other than said identifier of said complex data.

24. A product for use with a data storage and management apparatus for storing and managing complex data of an attribute of at least one object as at least one persistent object in a data storing system, where the complex data is comprised of a plurality of data elements having an identical data type, said product, when used with said data storage and management apparatus, is able to output control information which directs the data storage and management apparatus to execute a process comprising the steps of:
(a) storing an identifier of said complex data instead of said attribute of said at least one object in a first table; and
(b) storing said plurality of data elements with said identifier of said complex data in a second table, said plurality of data elements not pointing to a location of any of said at least one object, every one of said at least one persistent object including at least a portion of said complex data other than said identifier of said complex data.

25. A product for use with a data storage and management apparatus for storing and managing a data set being comprised of at least one complex data item having identical data structure, as an attribute of at least one persistent object, in a data storing system, where each of the at least one complex data item is comprised of a plurality of data elements each having a data type, said product, when used with said data storage and management apparatus, is able to output control information which directs the data storage and management apparatus to execute a process comprising the steps of:
(a) storing an identifier of said data set instead of said attribute of said at least one persistent object in a first table; and
(b) storing said plurality of data elements of the at least one complex data item of the data set with said identifier of said data set in a second table which is provided for each data structure,
said plurality of data elements not pointing to a location of any of said at least one persistent object, every one of said at least one persistent object including at least a portion of the at least one complex data item other than said identifier of said data set.

26. A product for use with a data management apparatus for managing data of at least one object stored as at least one persistent object in a data storing system which has no available filtering function, said product, when used with said data management apparatus, is able to output control information which directs the data management apparatus to comprise:
a resource management unit which functions as an interface with a client application, and receives a request for manipulation of said data of said at least one object, from the client application, where said request includes information on a filtering condition which is to be satisfied in the manipulation; and
a manipulating unit which performs the manipulation of said data of said at least one object, where the manipulation includes a filtering operation in accordance with said filtering condition;
said data comprising not complex data and complex data, said not complex data and said complex data being segregated from each other in a first table and a second table, respectively, said first table and said second table including an identifier of said complex data, every one of said at least one persistent object including at least a portion of said complex data other than said identifier of said complex data.

27. A data management apparatus for use in an information management system realized by using object-oriented technology, to manage at least one managed object as at least one persistent object in a database, said apparatus comprising:
a resource management unit including,
a list which defines correspondence between at least one name and at least one data structure type of attributes of the at least one managed object,
a request receiving unit which receives from a client application a request for manipulation on an attribute of said at least one managed object, and
a data-structure-information attaching unit which refers to said list to obtain the information on a data structure type corresponding to a name of said attribute, and adds said information on the data structure type to the request;
an interface unit which is provided as an interface between said resource management unit and a first query unit;
a data-structure-type determining unit which determines whether or not said attribute of the at least one managed object is a structure; and
said first query unit which translates said request into a query language, and performs the manipulation of a main table or a subtable, which is produced for each structure, in the database according to a result of the operation of the data-structure-type determining unit, where the main table includes data of a basic data type, and the subtable includes data of a structure, said main table and said subtable including an identifier of said data of said structure;
said data of said basic data type and said data of said structure being segregated from each other in said main table and said subtable, respectively, every one of said at least one persistent object including at least a portion of said data of said structure other than said identifier of said data of said structure.

* * * * *

UNITED STATES PATENT AND TRADEMARK OFFICE
CERTIFICATE OF CORRECTION

PATENT NO. : 6,728,727 B2
DATED : April 27, 2004
INVENTOR(S) : Hiroaki Komine, Noriyuki Yokoshi and Hiroko Yokota It is certified that error appears in the above-identified patent and that said Letters Patent is hereby corrected as shown below:

<u>Title page,</u>
Item [22], should read as follows:
-- Filed: Mar. 30, 2000 --.

Signed and Sealed this

First Day of November, 2005

JON W. DUDAS
*Director of the United States Patent and Trademark Office*